(12) United States Patent
Chen et al.

(10) Patent No.: US 11,558,230 B2
(45) Date of Patent: *Jan. 17, 2023

(54) FLEXIBLE TIME DIVISION DUPLEXING (TDD) SUBFRAME STRUCTURE WITH LATENCY REDUCTION

(71) Applicant: QUALCOMM Incorporated, San Diego, CA (US)

(72) Inventors: Wanshi Chen, San Diego, CA (US); Shimman Arvind Patel, San Diego, CA (US); Juan Montojo, San Diego, CA (US); Hao Xu, Beijing (CN); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,263

(22) Filed: Sep. 6, 2019

(65) Prior Publication Data

US 2020/0021422 A1 Jan. 16, 2020

Related U.S. Application Data

(63) Continuation of application No. 15/191,452, filed on Jun. 23, 2016, now Pat. No. 10,432,386.
(Continued)

(51) Int. Cl.
*H04L 27/26* (2006.01)
*H04L 1/18* (2006.01)
(Continued)

(52) U.S. Cl.
CPC ........ *H04L 27/2613* (2013.01); *H04L 1/1812* (2013.01); *H04L 5/0048* (2013.01);
(Continued)

(58) Field of Classification Search
CPC ....... H04L 5/14; H04L 1/1812; H04L 5/0053; H04L 5/0048; H04L 27/2613; H04W 72/0446; H04W 72/042; H04W 72/085
See application file for complete search history.

(56) References Cited

U.S. PATENT DOCUMENTS

| | | | |
|---|---|---|---|
| 7,869,417 | B2 | 1/2011 | Damnjanovic et al. |
| 2012/0135773 | A1 | 5/2012 | Shen et al. |

(Continued)

FOREIGN PATENT DOCUMENTS

| | | |
|---|---|---|
| CN | 102740477 A | 10/2012 |
| CN | 103517327 A | 1/2014 |

(Continued)

OTHER PUBLICATIONS

Intel Corporation: "TDD CA Soft Buffer Limitation Test," 3GPP Draft; R4-123253, 3rd Generation Partnership Project (3GPP), Mobile Competence Centre ; 650, Route Des Lucioles ; F-06921 Sophia-Antipolis Cedex; France, vol. RAN WG4, No. Prague, Czech Republic; May 21, 2012-May 25, 2012, May 14, 2012 (May 14, 2012), XP050614518, [retrieved on May 14, 2012].
(Continued)

*Primary Examiner* — Justin T Van Roie
(74) *Attorney, Agent, or Firm* — Dalei Dong; Holland & Hart LLP

(57) ABSTRACT

Methods, systems, and devices for wireless communication are described. A wireless device may identify an uplink/downlink (UL/DL) configuration that defines subframe configuration options for each subframe of a frame. For example, the UL/DL configuration may establish parameters for time division duplexing (TDD) operation between a base station and a user equipment (UE). The wireless device (e.g., the UE or base station) may determine a constraint for a subframe of the frame based on the UL/DL configuration and then determine an adaptive subframe configuration
(Continued)

based on the constraint. The adaptive subframe configuration may include one or several downlink symbol periods and one or several uplink symbol periods. The wireless device may then communicate during the subframe according to the adaptive subframe configuration rather than the original UL/DL configuration; and, because the adaptive subframe may be constrained by the identified UL/DL configuration, the communication during the subframe may avoid disruption to UEs.

20 Claims, 16 Drawing Sheets

Related U.S. Application Data

(60) Provisional application No. 62/243,631, filed on Oct. 19, 2015.

(51) Int. Cl.
  *H04L 5/00* (2006.01)
  *H04L 5/14* (2006.01)
  *H04W 72/04* (2009.01)
  *H04W 72/08* (2009.01)

(52) U.S. Cl.
  CPC .............. *H04L 5/0053* (2013.01); *H04L 5/14* (2013.01); *H04W 72/042* (2013.01); *H04W 72/0446* (2013.01); *H04W 72/085* (2013.01)

(56) References Cited

U.S. PATENT DOCUMENTS

| | | | |
|---|---|---|---|
| 2014/0177492 A1 | 6/2014 | Sun et al. | |
| 2015/0018869 A1 | 1/2015 | Benz et al. | |
| 2015/0023145 A1 | 1/2015 | Kim et al. | |
| 2015/0188650 A1* | 7/2015 | Au ...................... | H04W 72/042 370/312 |
| 2015/0188690 A1 | 7/2015 | Khoryaev et al. | |
| 2016/0330737 A1 | 11/2016 | Takeda et al. | |
| 2016/0338049 A1* | 11/2016 | Takeda .............. | H04W 72/0446 |
| 2017/0048717 A1 | 2/2017 | Yoo et al. | |
| 2017/0111160 A1 | 4/2017 | Chen et al. | |
| 2020/0260527 A1* | 8/2020 | Xiong .................. | H04L 5/0073 |

FOREIGN PATENT DOCUMENTS

| | | | |
|---|---|---|---|
| EP | 2802091 A1 | 11/2014 | |
| JP | 2013153518 A | 8/2013 | |
| WO | WO-07014021 | 2/2007 | |
| WO | WO-2012106840 A1 | 8/2012 | |
| WO | WO-2012121574 A2 | 9/2012 | |
| WO | WO-2013162785 A1 | 10/2013 | |
| WO | WO-2014082584 A1 | 6/2014 | |
| WO | WO-2015108007 A1 | 7/2015 | |
| WO | WO-2015108008 A1 * | 7/2015 | ........ H04W 72/0446 |
| WO | WO-2015126028 A1 | 8/2015 | |
| WO | WO-2015126607 A1 | 8/2015 | |
| WO | WO-2015137719 A1 | 9/2015 | |
| WO | WO-2017069848 A1 | 4/2017 | |

OTHER PUBLICATIONS

International Search Report and Written Opinion—PCT/US2016/048617—ISA/EPO—dated Nov. 7, 2016.
NVIDIA: "Remaining Details of NAICS Higher-layer Signaling", 3GPP Draft; R1-143118, 3rd Generation Partnership Project (3GPP), Mobile Competence Centre ; 650, Route Des Lucioles ; F-06921 Sophia-Antipolis Cedex; France vol. RAN WG1, No. Dresden, Germany; Aug. 18, 2014-Aug. 22, 2014, Aug. 17, 2014 (Aug. 17, 2014), XP050788596, Retrieved from the Internet: URL: http://www.3gpp.org/ftp/Meetings_3GPP_SYNC/RAN1/Docs/[retrieved on Aug. 17, 2014], 8 Pages.
Samsung: "HARQ-ACK Transmission for Enhanced CA", 3GPP Draft; R1-152851, 3rd Generation Partnership Project (3GPP), Mobile Competence Centre ; 650, Route Des Lucioles ; F-06921 Sophia-Antipolis Cedex ; France vol. RAN WG1, No. Fukuoka, Japan; May 25, 2015-May 29, 2015, May 15, 2015 (May 15, 2015), XP050968403, 4 pages. Retrieved from the Internet: URL: http://www.3gpp.org/ftp/Meetings_3GPP_SYNC/RAN1/Docs/ [retrieved on May 15, 2015].
NVIDIA: "Remaining Details of NAICS Higher-Layer Signaling", 3GPP TSG-RAN WG4#72, R4-144684, Aug. 11, 2014, 6 Pages, Internet URL: http://www.3gpp.org/ftp/tsg_ran/WG4_Radio/TSGR4_72/Docs/R4-144684.zip.
European Search Report—EP20208260—Search Authority—Munich—dated Dec. 11, 2020.
Qualcomm: "5G Views on Technology & Standardization", 3GPP Draft, 3GPP RAN workshop on 5G, RWS-150012, QCOM-5G, 3GPP workshop 2015-09-17_18_RAN_5G, 3rd Generation Partnership Project (3GPP), Mobile Competence Centre, 650, Route Des Lucioles, F-06921, Sophia-Antipolis Cedex, France, Sep. 2, 2015 (Sep. 2, 2015), 21 Pages, XP051043597, Retrieved from the Internet: URL: http://www.3gpp.org/ftp/workshop/2015-09-17_18_RAN_5G/Docs/RWS-150012.zip.
Ericsson, "Framework for UE Demodulation and Requirements for EIMTA", 3GPP TSG-RAN WG4 #70bis, R4-142034, San Jose Del Cabo, Mexico, Mar. 31-Apr. 4, 2014, 3 Pages.
Ericsson, "Further Discussion on the Demodulation Setup for eIMTA", 3GPP TSG-RAN WG4 #72, R4-144943, Dresden, Germany, Aug. 18 Aug. 22, 2014, 3 Pages.
Ericsson, "5G- Key Component of the Networked Society," 3GPP RAN Workshop on 5G, RWS-150009, Phoenix, AZ, USA, Sep. 17-18, 2015, 55 pgs., XP051043759, 3rd Generation D Partnership Project, Sophia-Antipolis Cedex, France, Retrieved from the Internet: URL:http://www.3gpp.org/ftp/workshop/2015-09-17_18_RAN_5G/Docs/ [retrieved on Aug. 3, 2017], Slides 5, 33-34.
Intel Corporation: "View on 5G Radio Technology and Standardization", 3GPP RAN Workshop on 5G, Phoenix, AZ, USA, 3GPP Workshop Sep. 17, 2015_18_RAN_5G_RWS-150023, 3GPP, Sep. 3, 2015, 74 Pages, Sep. 17-18, 2015.

* cited by examiner

FLEXIBLE TIME DIVISION DUPLEXING (TDD) SUBFRAME STRUCTURE WITH LATENCY REDUCTION

CROSS REFERENCES

The present Application for Patent is a Continuation application of U.S. patent application Ser. No. 15/191,452, entitled "FLEXIBLE TIME DIVISION DUPLEXING (TDD) SUBFRAME STRUCTURE WITH LATENCY REDUCTION," filed Jun. 23, 2016, now U.S. Pat. No. 10,432,386, which claims priority to U.S. Provisional Patent Application No. 62/243,631 entitled "FLEXIBLE TIME DIVISION DUPLEXING (TDD) SUBFRAME STRUCTURE WITH LATENCY REDUCTION," filed Oct. 19, 2015, assigned to the assignee hereof.

BACKGROUND

The following relates generally to wireless communication and more specifically to flexible time division duplexing (TDD) subframe structures with latency reduction.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless network may use TDD operations to accommodate both uplink and downlink communications using the same frequency spectrum. For example, a base station may select a radio frame configuration in which each subframe is designated as an uplink subframe, a downlink subframe, or a special subframe (i.e., a transition subframe between uplink and downlink subframes). However, designating an entire subframe for uplink or downlink may result in significant round trip latency. This may restrict the throughput or responsiveness of a communication network.

SUMMARY

A wireless device may identify an uplink/downlink (UL/DL) configuration which defines subframe configuration options for each subframe of a frame. For example, the UL/DL configuration may establish parameters for time division duplexing (TDD) operation between a base station and a user equipment (UE). The device (e.g., the UE or base station) may determine a constraint for a subframe of the frame based on the UL/DL configuration and then determine an adaptive subframe configuration based on the constraint. The constraint on the adaptive subframe may be determined or imposed to avoid disruption with communications by other UEs during the time period of the adaptive subframes. The adaptive subframe configuration may include at least one downlink (DL) symbol period and at least one uplink (UL) symbol period. The device may then communicate during the subframe according to the adaptive subframe configuration rather than the original UL/DL configuration.

A method of wireless communication is described. The method may include identifying a UL/DL configuration which defines subframe configuration options for each subframe of a frame, determining a constraint for a subframe of the frame based at least in part on the UL/DL configuration, and determining an adaptive subframe configuration for the subframe based at least in part on the constraint. The adaptive subframe configuration may include at least one DL symbol period and at least one UL symbol period. The method may also include communicating during the subframe according to the adaptive subframe configuration.

An apparatus for wireless communication is described. The apparatus may include means for identifying a UL/DL configuration which defines subframe configuration options for each subframe of a frame, means for determining a constraint for a subframe of the frame based at least in part on the UL/DL configuration, and means for determining an adaptive subframe configuration for the subframe based at least in part on the constraint. The adaptive subframe configuration may include at least one DL symbol period and at least one UL symbol period. The apparatus may also include means for communicating during the subframe according to the adaptive subframe configuration.

A further apparatus for wireless communication described. The apparatus may include a processor, memory in electronic communication with the processor, and instructions stored in the memory. The instructions may be operable, when executed by the processor, to cause the apparatus to identify a UL/DL configuration which defines subframe configuration options for each subframe of a frame, determine a constraint for a subframe of the frame based at least in part on the UL/DL configuration, and determine an adaptive subframe configuration for the subframe based at least in part on the constraint. The adaptive subframe configuration may include at least one DL symbol period and at least one UL symbol period. The instructions may also be operable to cause the apparatus to communicate during the subframe according to the adaptive subframe configuration.

A non-transitory computer-readable medium storing code for wireless communication is also described. The non-transitory computer-readable medium may include code comprising instructions executable to identify a UL/DL configuration which defines subframe configuration options for each subframe of a frame, determine a constraint for a subframe of the frame based at least in part on the UL/DL configuration, and determine an adaptive subframe configuration for the subframe based at least in part on the constraint. The adaptive subframe configuration may include at least one DL symbol period and at least one UL symbol period. The code may also be executable to communicate during the subframe according to the adaptive subframe configuration.

In some examples of the method, apparatuses, or non-transitory computer-readable medium described herein, the subframe configuration options may include an UL subframe configuration, a DL subframe configuration, or a special subframe configuration for each subframe of the frame. In some examples the constraint may be based at least in part on a cell-specific reference signals (CRS) transmission or a multimedia broadcast multicast service (MBMS) transmission when the UL/DL configuration for the subframe is a DL subframe configuration. Additionally or alternatively, in some examples the constraint may be based at least in part on a synchronization signal when the UL/DL configuration for the subframe is a special subframe configuration.

In some examples of the method, apparatuses, or non-transitory computer-readable medium described herein, the constraint may be based at least in part on a sounding reference signal (SRS) transmission when the UL/DL configuration for the subframe is an UL subframe configuration. In some examples, the UL/DL configuration may be identified based in part on reception of at least one of system information (SI), an enhanced interference management and traffic adaptation (eIMTA) indication, or a DL hybrid automatic repeat request (HARQ) reference configuration, or any combination thereof.

In some examples of the method, apparatuses, or non-transitory computer-readable medium described herein, the adaptive subframe configuration comprises two or more symbol partitions corresponding to a set of UEs. In some examples, each symbol partition may include a DL portion, an UL portion, and a guard period, and the DL portion for each partition may end before an UL portion of another symbol partition begins. In some examples, each symbol partition may be based at least in part on a UE processing capability, a link budget, a UL timing advance, or a proportion of UL data to DL data for a corresponding UE of the set of UEs.

Some examples of the method, apparatuses, or non-transitory computer-readable medium described herein may further include processes, features, means, or instructions for transmitting an indication of the adaptive subframe configuration to one or more UEs. Some examples may include processes, features, means, or instructions for receiving an indication of the adaptive subframe configuration from a base station, and the adaptive subframe configuration determination may be based at least in part on the indication. In some examples, the adaptive subframe configuration may include a first set of symbol partitions for a DL operation and a second set of symbol partitions for an UL operation.

In some examples of the method, apparatuses, or non-transitory computer-readable medium described herein, the adaptive subframe configuration may include two or more different starting symbols, and each starting symbol may be associated with a type of UL control information (UCI) or an UL shared data. In some examples, the adaptive subframe configuration may include an UL control channel and an UL data channel. Additionally or alternatively, the adaptive subframe configuration may include an UL data portion and HARQ feedback portion. In some examples, the adaptive subframe configuration may include a frequency division multiplexing (FDM) configuration or a time division multiplexing (TDM) configuration, or a combination thereof. In some examples, a DL portion of the adaptive subframe configuration may include at least one control channel symbol period and at least one data channel symbol period.

In some examples of the method, apparatuses, or non-transitory computer-readable medium described herein, a DL grant may indicate a first structure of the adaptive subframe configuration, and an UL grant may indicate a second structure of the adaptive subframe configuration. In some examples, the adaptive subframe configuration may include a reference signal configuration, and each reference signal of the reference signal configuration may be substantially located in the beginning of the subframe. Additionally or alternatively, in some examples the reference signal configuration may include a channel state information (CSI) reference signal (CSI-RS) configuration, and the CSI-RS configuration may be dynamically or semi-statically indicated.

In some examples of the method, apparatuses, or non-transitory computer-readable medium described herein, the adaptive subframe configuration may be associated with a transport block size (TBS) scaling parameter for at least one of a DL operation or an UL operation, and the TBS scaling parameter may be determined based at least in part on the adaptive subframe configuration. In some examples the adaptive subframe configuration may be associated with a HARQ process that may be different from a set of HARQ processes associated with a DL subframe, a special subframe, or an UL subframe of the frame. The adaptive subframe configuration may be associated with a first portion of a soft buffer that may be different from a second portion of the soft buffer associated with the UL/DL configuration. Additionally or alternatively, some examples may include processes, features, means, or instructions for exchanging, with another base station of a wireless network, interference statistics for the adaptive subframe configuration in relation to another subframe of the frame.

DETAILED DESCRIPTION

Wireless communications systems may use low latency operations in which transmission time intervals (TTIs) may have a reduced duration compared to other TTIs in the system or TTIs of other wireless systems. The subframe structure for time division duplexing (TDD) communications may take on various configurations in such low latency systems. For example, some TTIs (e.g., some subframes) may include both UL and DL regions so that latency reductions—relative to entire subframes designated for UL or DL—may be realized by the round trip time of transmissions between a user equipment (UE) and a base station.

For example, in one subframe, which may be referred to as an adaptive subframe, there may be a downlink (DL) region carrying user data and control information, a guard period, and an uplink (UL) region carrying uplink control information. In some cases, the DL region may contain scheduling information for both UL and DL transmissions. The subframe structure for the adaptive subframes may be modified or adapted based on various configuration options.

In some cases, an adaptive subframe may be used for communication with multiple UEs. The subframe may take on various structures based on the capabilities of one or more of the UEs and uplink/downlink (UL/DL) configurations for the radio frame that includes the adaptive subframes. In other cases, different adaptive subframe structures may be used for different frequency regions used by a single UE.

Aspects of the disclosure introduced above are initially described in the context of a wireless communication system. Specific examples of subframe configurations and subframe structures associated with an adaptive subframe are then provided. Aspects of the disclosure are further illustrated by and described with reference to apparatus diagrams, system diagrams, and flowcharts that relate to flexible TDD subframe structure with latency reduction.

Figure 1:
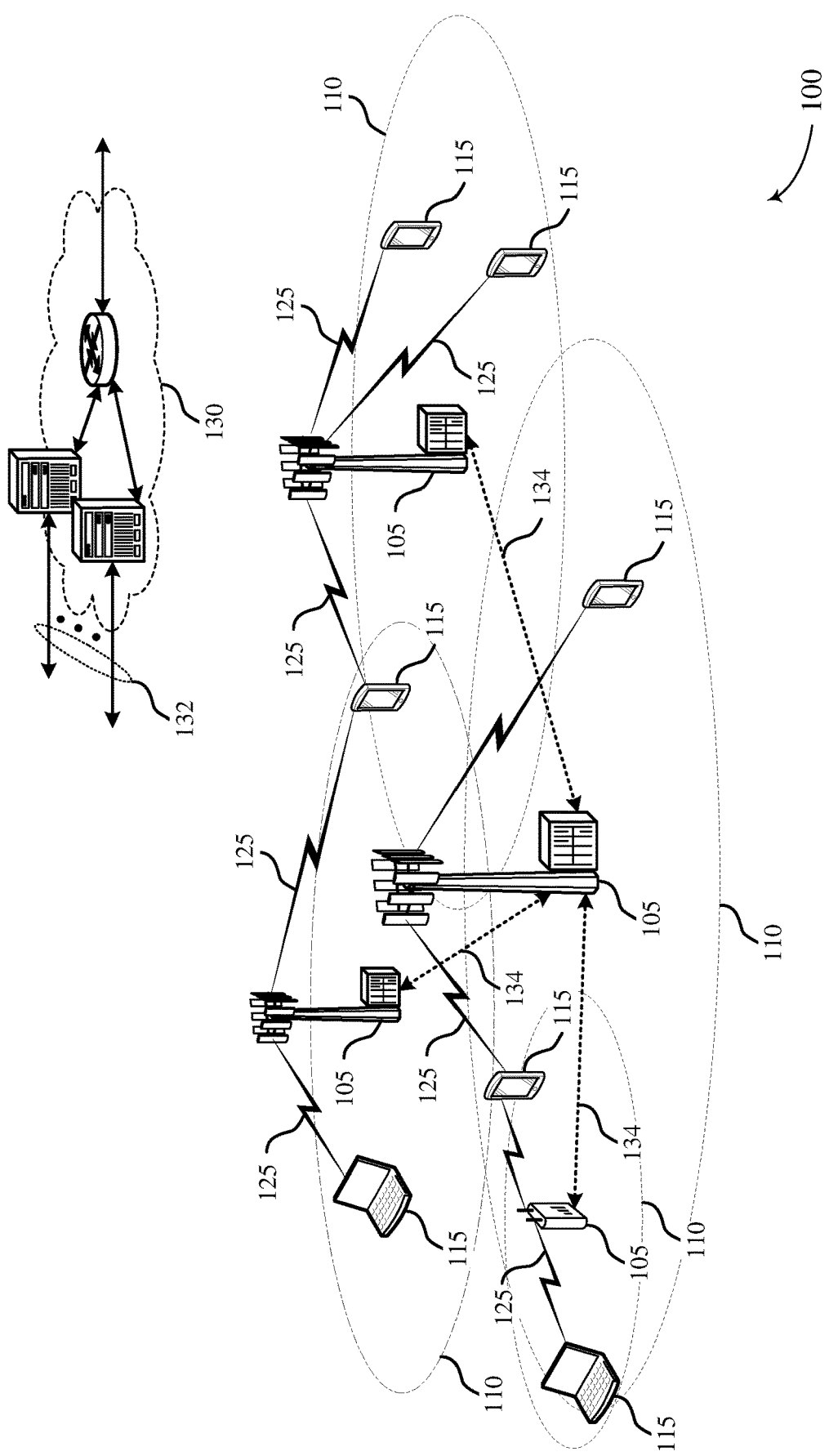
FIG. 1 illustrates an example of a wireless communications system that supports flexible time division duplexing (TDD) subframe structure with latency reduction in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support the use of adaptive subframes for TDD communications. The adaptive subframe may be determined based on various configuration options constrained by the uplink/downlink (UL/DL) of the TDD configuration.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. The communication links 125 may include communication using adaptive subframes as described herein.

UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device or the like. Some UEs 115 may support communication using, and benefit from latency reductions associated with, adaptive subframes.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. In order to support communication using adaptive subframes, base stations 105 may exchange interference statistics with the core network and with one another over backhaul links 132 and 134.

Time intervals in LTE may be expressed in multiples of a basic time unit (e.g., the sampling period, $T_s=1/30,720,000$ seconds), and may be organized according to radio frames of length 10 ms ($Tf=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix (CP) prepended to each symbol). Excluding the CP, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected CCs using short TTIs). As described below, adaptive subframes may support both DL and UL communications.

A frequency region used for communication may also be referred to as a carrier, a component carrier (CC), a layer, a channel, etc. The term "component carrier" may refer to each of the multiple carriers utilized by a UE 115 in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard.

Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions) may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

Thus, a UE 115 may communicate with a single base station 105 utilizing multiple carriers, and may also communicate with multiple base stations 105 simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE 115 basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE 115 basis. In some cases, secondary cells may not include or be configured to transmit the same control information as the primary cell.

Carriers may transmit bidirectional communications using frequency division duplex (FDD) (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations 105, interference between UL and DL communications from base stations 105 and UEs 115, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. Some TDD frames may include adaptive subframes, as described below.

In some cases, wireless communications system 100 may utilize one or more enhanced component carriers (eCCs). An eCC may be characterized by one or more features including: flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that may not be capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

HARQ may be a method of ensuring that data is received correctly over communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response, and retransmission may be referred to as a HARQ process. In some cases, a limited number of HARQ processes may be used for a given communication link 125. Latency associated with HARQ operations may be reduced by providing both an initial transmission and HARQ feedback within a single subframe, such as an adaptive subframe.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6$d$B higher than the surrounding data elements) to make them resilient to noise and interference. CRS may be embedded in 4 to 16 resource element (RE)s in each resource block (RB) based on the number of antenna ports or layers (up to 4) of the receiving UEs 115.

In addition to CRS, which may be utilized by all UEs 115 in the coverage area 110 of the base station 105, demodulation reference signal (DMRS) may be directed toward specific UEs 115 and may be transmitted only on RBs assigned to those UEs 115. DMRS may include signals on 6 REs in each RB in which they are transmitted. The DMRS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as CSI reference signals (CSI-RS) may be included to aid in generating CSI. On the UL, a UE 115 may transmit a combination of periodic SRS and UL DMRS for link adaptation and demodulation, respectively.

Some base stations 105 may utilize a portion of the available DL bandwidth to broadcast multimedia data to some or all UEs 115 within the coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations 105 may be referred to as MBMS or eMBMS cells. In some cases, MBMS cells may be grouped together in a MBMS single frequency network (MBSFN) where the broadcast media is transmitted on the same frequency resources by each supporting cell. However, some UEs 115 in the coverage area 110 may elect not to receive the MBMS data.

A UE 115 or base station 105 may identify a first uplink/downlink (UL/DL) configuration which defines subframe configuration options for each subframe of a frame (e.g., a TDD configuration). The UE 115 or base station 105 may determine a constraint for a subframe of the frame based on the UL/DL configuration and then determine an adaptive subframe configuration based on the constraint. The constraints on an adaptive subframe configuration may depend on a UL/DL configuration, MBMS within a radio frame, CRS locations, SRS transmission, or the like. The adaptive subframe configuration may include at least one downlink (DL) symbol period and at least one uplink (UL) symbol period. The UE 115 or base station 105 may then communicate during the subframe according to the adaptive subframe configuration rather than the original UL/DL configuration.

Figure 2:
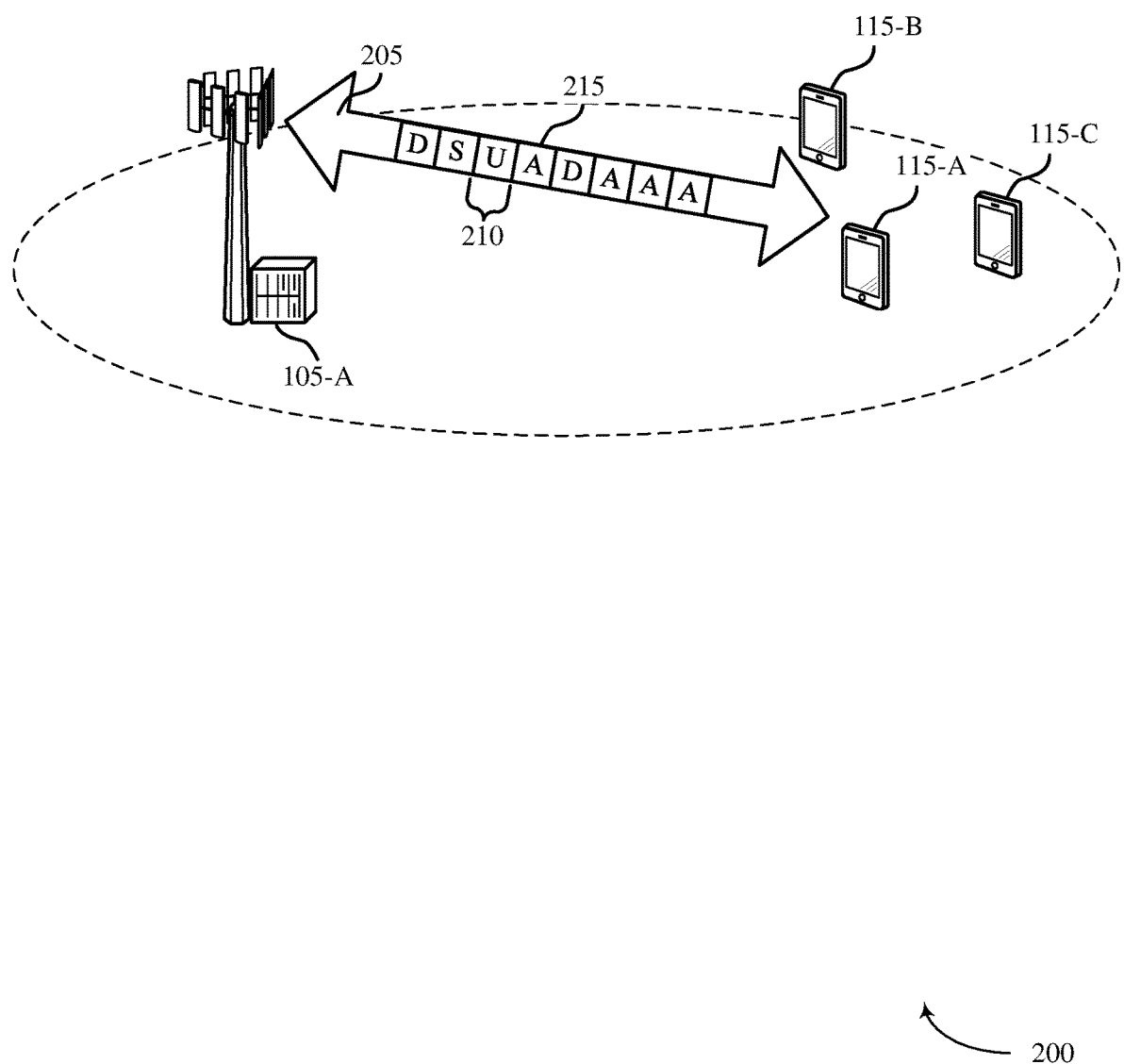
FIG. 2 illustrates an example of a wireless communications system that supports flexible TDD subframe structure with latency reduction in accordance with aspects of the present disclosure.

FIG. 2 illustrates an example of a wireless communications system 200 that supports flexible TDD subframe structure with latency reduction. Wireless communications system 200 may include base station 105-a and UE 115-a, which may be examples of the corresponding devices described with reference to FIG. 1. Wireless communications system 200 may support communication using subframe configurations that include adaptive subframes.

Wireless communications system 200 may use a reduced or variable TTI duration to reduce latency between DL and UL transmissions. In some wireless systems, a HARQ response time may take as long as 4 ms. Low latency operation may enable base station 105-a and UE 115-a to complete HARQ in hundreds of microseconds. In some cases, a low latency TTI may correspond to one LTE symbol period or approximately 71 µs for normal cyclic prefix (CP) and approximately 83 µs for extended CP. However, other TTI lengths are possible (e.g., two LTE symbol periods, 1 slot, etc.). In some reduced latency configurations, a subframe (e.g., an adaptive subframe) within the communication link 205 may include both UL and DL regions.

Based on the potential for both UL and DL TTIs within a subframe, and because the transmission direction may be dynamically scheduled by base station 105-a, UE 115-a may not be aware of whether an upcoming TTI is going to be an UL TTI or a DL TTI. Thus, in some examples, UE 115-a may monitor each TTI as if it might contain a DL control or data transmission and may check that assumption against implicit or explicit signaling. For example, UE 115-a or base station 105-a may receive a grant and determine—e.g., based on HARQ timing (for a DL grant) or UL scheduling timing (for an UL grant)—that a subsequent TTI is an UL TTI. Additionally or alternatively, UE 115-a or base station 105-a may receive explicit signaling of the transmission direction at a predetermined time period prior to a given TTI. In some cases, if UE 115-a determines that a TTI is an UL TTI, based on either explicit or implicit signaling, UE 115-a may refrain from monitoring during the TTI in order to conserve power (or, in some cases, it may transmit UL data).

In some cases, communication using TDD may be associated with several UL/DL configurations of TDD subframes 210, which may be designated as UL, DL, or special (or D', U', or A as described below). Multiple switching periodicities (i.e., 5 ms and 10 ms) may also be associated with each of the subframe configurations, where each periodicity is associated with a different number of special subframes. For example, a 5 ms switch-point periodicity may be associated with two special subframes in one frame, and a 10 ms switch-point periodicity may correspond to one special subframe in a frame. As shown in Table 1, an example of the relationships between various uplink/downlink configurations and downlink-to-uplink switch-point periodicity is provided.

TABLE 1

UL/DL Configurations for TDD Frames

| Uplink-Downlink Configuration | Downlink-to-Uplink Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Due to backward compatibility constraints for certain TDD DL or UL subframe configurations, supporting low latency under TDD may utilize additional control signaling or implicit control conventions. For example, subframe configurations may be indicated with a system information broadcast (e.g., system information block Type 1 (SIB1)). Certain UEs 115 may recognize and use DL and UL subframes as subframes that support low latency operation while others recognize a non-low latency configuration. Subframe configurations may be subject to cell-specific reference signal (CRS) symbols, guard periods (GPs), or control regions for other network operation. Although CRS may not be present in certain subframe types or in a certain region of certain subframes (e.g., multicast-broadcast single-frequency network (MBSFN) region in MBSFN subframes), such subframes may still be used for low latency operation. In some cases, UL subframes or special subframes may provide additional flexibility for DL/UL low latency arrangements. Dynamic traffic variations in DL and UL transmission may also result in relatively greater DL traffic than UL traffic or vice versa.

In some cases, the subframe structure for TDD communications may take on different configurations. For example, a primarily downlink subframe, denoted as D', can include a downlink portion carrying communication data and/or control information, a guard period, and an uplink portion carrying uplink control information. Alternatively, a primarily uplink subframe, denoted as U', may include a downlink portion carrying control information (e.g., scheduling information for UL communications), a guard period, and an uplink portion carrying UL data and/or control information.

The management of frame and subframe configurations may be based on different types and/or operation conditions of UEs 115, subframe types that are associated with certain wireless systems, and/or link direction characteristics (e.g., different structures for PDSCH and PUSCH). In some cases, subframe management may also be based on a guard period that can be configured differently based on whether it is cell-specific vs. UE-specific, UL vs. DL, or semi-static vs. dynamic. An indication of whether a subframe region is used for DL, UL, or a GP, in addition to transport block size (TBS), and control/reference signal (RS) placement may be transmitted by base station 105-a or indicated implicitly.

In some cases, multiple UEs 115 with different capabilities may coexist within the same wireless communication system that uses multiple frame management configurations. That is, within the same cell, there may be some UEs 115 that are not aware of an adaptive subframe structure and other UEs 115 that are aware of the adaptive subframe structure. As a result, different indications may be used to indicate multiple characteristics of a transmission. For example, a semi-static SIB1 indication may be read by a UE 115 that does not have capabilities for enhanced interference mitigation and traffic adaptation (eIMTA) (i.e., a non-eIMTA UE 115), while a frame structure (the UL/DL subframe configuration) indicated by SIB1 may also provide a reference configuration for UL HARQ operation for eIMTA capable UEs 115. In other examples, a dynamic eIMTA indication may be carried via an indicator (e.g., a 3-bit information field) in downlink control information (DCI), which can be updated periodically (e.g., on a per frame basis or according to another periodicity). A semi-static DL HARQ reference configuration may also be used for eIMTA UEs 115 and DL HARQ timing management.

In some cases, to minimize the impact of different frame configurations for certain UEs 115, DL subframes in SIB1 (including DwPTS in special subframes) may not be subject to different subframe structures. Flexible DL subframes indicated in eIMTA DCI may additionally or alternatively be adapted to different subframe structures, which may not have an impact on eIMTA UEs 115. In cases where UL subframes are relatively more flexible than DL subframe, with a periodically configured uplink control indication (UCI) (such as CSI, SR, etc.), the corresponding UL subframes may not be subject to a different subframe structure.

An adaptive subframe structure (which may be denoted as an "A" type subframe), may be dependent on the subframe structure used by legacy wireless systems. As used herein, the term legacy may refer to operation according to earlier releases of a wireless communications standard. That is, in A subframe 215, a TTI containing a downlink pilot time slot (DwPTS) may be associated with legacy DL transmissions, and at least the first three symbols in the special subframe (where a primary synchronization signal (PSS) may be located in the third symbol of special subframe) may also be associated with legacy DL transmissions.

In some cases, there may be constraints on A subframe 215, which may be different based on the subframe configurations used by legacy wireless communications systems or devices (e.g., different from a TDD configuration using DL, special, or UL subframes). For example, a subframe may be indicated by SIB1 as a DL subframe. In this case, if the subframe is not associated with MBSFN, then a CRS may be contained in A subframe 215. Alternatively, if the subframe is associated with MBSFN, then the first symbol may be used for DL, the second symbol may also be for DL (when four CRS ports are used), and the remaining symbols may not contain a CRS. Alternatively, a UE 115 may be indicated whether CRS is present in these DL subframes, or in other subframes, for instance.

In cases where a special subframe is used, A subframe 215 may use the first three symbols for DL (where a PSS may be located in 3rd symbol). In such cases, certain UEs 115 may be indicated with a special subframe structure of three DwPTSs including: 9 GPs and 2 uplink pilot time slot (UpPTS) symbols, for a total of 11 symbols (including GP and UpPTS). As a result, these UEs may not be impacted if the GP is used for DL or UL transmissions. In other cases where an UL subframe is used, the last symbol of A subframe 215 may be used for a sounding reference signal (SRS) in at least some A subframes 215, which may align with cell-specific SRS subframes. In some cases, a cell-specific reference signal (CRS) may not be present in A subframes 215.

Different UEs 115 may have different processing capabilities, experience different channel/interference conditions, different uplink timing advances (e.g., to compensate for a propagation delay associated with the UE), or have DL/UL traffic transmission ratios. Thus, a UE-specific adaptive subframe structure may be used where the partitioning of DL/GP/UL can be UE-specific and the scheduled DL/UL transmissions for different UEs 115 may or may not overlap in time or frequency, or both. In some cases, for any given time instance of A subframe 215, a configuration may be selected to avoid conflict caused by transmissions in different directions.

For example, different frame configurations may be used for three different UEs 115: UE 115-a may have less processing capability and/or large update timing advance associated with a longer GP; UE 115-b may have greater processing capability and/or small uplink timing advance associated with a shorter GP; and UE 115-c may be associated with a longer UL duration for improved uplink budget and/or more UL data transmission opportunities (e.g., 4-symbol PUCCH transmission versus 2-symbol PUCCH for other UEs 115). In such examples, three structures for A subframes 215 can co-exist in a same subframe 210 for three different UEs 115, and a DL/UL control region may be present in all structures.

If the structure of A subframe 215 is configured to be UE-specific, then UE-specific or group specific signaling may be used as opposed to broadcast signaling. Broadcast signaling may be in a form similar to physical control format indicator channel (PCFICH), or physical downlink control channel (PDCCH), physical HARQ indicator channel (PHICH), etc. In some cases, UE-specific signaling may be transmitted in downlink control information (DCI) scheduling in DL or UL traffic, which may indicate whether the subframe 210 is an A subframe 215. If it is an A subframe 215, the corresponding structure may be one of a set of possible structures, where the set of structures can be defined differently for DL and UL operations. In some cases, group-specific signaling may include a group of UEs 115 (e.g., UEs 115-a, 115-b, and 115-c) monitoring for DCI that indicates a structure out of a set of predefined or preconfigured structures for A subframes 215. UE-specific or group-specific signaling can be done on a per subframe basis, and as a result, DL/GP/UL partitioning can be dynamically managed to target UE-specific traffic transmissions, channel/interference conditions, uplink timing advance conditions, UE capability, etc.

UE 115-a may also be scheduled with two or more different structures in a subframe. For example, a first structure may include DL control/data and UL control and a second structure may include DL control and UL data. Thus, UCI (e.g., ACK/NACK) and PUSCH may start in different symbols, and may therefore have different durations. In some cases, UE 115-a may have both DL and UL data, and the processing time from DL PDSCH to the corresponding HARQ ACK/NAK response may be much longer than the processing time from a UL grant to the corresponding PUSCH. When UE 115-a is indicated by two or more structures in a subframe, a common GP among the structures may be used to accommodate DL/UL and UL/DL switching, UL timing advance, etc.

In some cases, different UCI may also have different starting symbols in a subframe configuration. For example, ACK/NACK may begin at a different symbol than periodic channel state information (P-CSI) or a scheduling request (SR). In some cases, aperiodic CSI (A-CSI), P-CSI, and an SR may start in the same symbol as a PUSCH. Alternatively, A-CSI may begin later than the PUSCH due to the more complicated measurement and preparation associated with CSI feedback. In some cases, transmission of UCI can be in a separate PUCCH, or may be piggybacked on the PUSCH. Thus, if the PUCCH is used for carrying ACK/NACK, PUCCH may start from a symbol different than that of PUSCH. This may represent an alternative presentation of a DL/UL structure, where ACK/NACK starts later than PUSCH/CSI/SR.

Different types of resource allocation (multiplexing) may be used in conjunction with adaptive subframe structures. For example, wireless communications system 200 may use frequency division multiplexing (FDM) or time division multiplexing (TDM) or a combination of both to distribute resources among UEs 115-a, 115-b and 115-c. FDM may be associated with a UE-specific GP and greater time/frequency scheduling flexibility. However, DL times and UL times may not intersect and may depend on the use of front-loaded control information. As a result, legacy DL or UL resource allocation mechanisms may be used.

TDM may enable low latency operation with greater frequency diversity for each UE 115. In some TDM systems, the total GP time may be efficiently configured (e.g. UEs 115 near base station 105-a may be assigned UL subframes closer to GPs). Additionally, a control channel can be self-contained within each burst, as opposed to using a front-loaded control channel (which may also be used). The control channel can indicate the start and/or end symbol for the transmission, as well as the symbol for HARQ ACK (e.g., for DL). Alternately, a combination of FDM and TDM may be used, which may be associated with a block-based low latency design, where each symbol may multiplex a limited number of UEs 115, and the resource allocation granularity can be relatively large (e.g., 25 resource blocks (RBs)).

In some examples, a control channel (such as a control channel used for scheduling DL data) may be located in the first symbol(s) of A subframe 215 for early decoding. This control channel may be or include PDCCH or ePDCCH. The control channel may also dynamically indicate the subframe structure, which can be differently defined for DL and UL grants. For example, a DL grant may indicate a first structure, while an UL grant may indicate a second structure.

In some examples, a RS may be front-loaded in A subframe 215 to facilitate early decoding which may not interfere with CRS based demodulation. For demodulation reference signal (DM-RS) based demodulation, a DM-RS may transmitted as early as possible in A subframe 215, such as cases where A subframe 215 is adapted from an UL subframe of a legacy wireless system. For example, a DM-RS is present in symbols 0/1/4/5 in the first slot in A subframe 215.

Non-zero power (NZP) channel state information reference signal (CSI-RS) for channel measurements and channel state information interference measurement (CSI-IM) for interference measurements may also be supported in A subframes 215. The presence of an NZP CSI-RS and CSI-IM in an A subframe may be semi-statically configured or dynamically indicated (e.g., in a DCI). CSI feedback for A subframes 215 may be separately managed from the CSI for in other DL subframes. For example, a first CSI process may be used for DL subframes and a second CSI process may be used for A subframes. Thus, the assumptions of CSI feedback for A subframes 215 can be different from those for the DL subframes. For example, there may be an assumption of a certain DL duration, where the duration may correspond to a slot (half subframe) as opposed to a subframe.

An efficient design for transport block size (TBS) determination for both DL data and UL data may be used in cases of limited resource availability for DL and UL. For DL data, the number of scheduled RBs may be scaled by a scaling factor before being used for TBS lookup. In some cases, one or more scaling factors can be defined for A subframes that represent the DL resource availability in the A subframes. Alternatively, other means may be used, such as scaling the TBS directly based on resource availability. For UL data, the number of scheduled RBs may also be scaled by a scaling factor, as discussed above with DL data.

Due to different resource availability, UL may be managed separately for A subframes 215 and other UL subframes. For example, in UL subframes, synchronous HARQ processes may be used for UL, and in A subframes, asynchronous HARQ processes may be used for UL. In some cases, there may not be a TBS with HARQ processes that correspond to the UL and A subframes, which may result in clean separation between the two. In some cases, an asynchronous UL HARQ may be applicable to both UL subframes and A subframes for UE 115-a. For example, a TBS that corresponds to both types of subframes may be transmitted during a HARQ operation.

In some cases, FDM subframes used for legacy devices and A subframes may be transmitted in the same subframe, such as when the A subframe is adapted from an UL subframe of the legacy operation. For example, the same subframe may contain a DL subframe configuration and an A configuration, an UL subframe configuration and an A subframe configuration, or a special subframe and an A subframe configuration. A corresponding guard band may be used between each configuration to minimize interference.

In some examples, HARQ timing for DL/UL subframes may be separately managed from A subframes 215. That is, for A subframes, HARQ timing may be self-contained within a subframe and in other DL/UL subframes a reference configuration may be defined for DL and UL respectively. For example, a radio resource control (RRC) configured reference configuration may be used for DL HARQ timing. A reference configuration may be based on the configuration indicated in SIB1 for UL HARQ timing.

A soft buffer for A subframes 215 and other subframes 210 may be jointly or separately managed. Under a joint buffer management, soft buffer partitioning can be done for A subframes 215 and other DL subframes. Under a separate buffer management, soft buffering is done differently for regular DL subframes and A subframes 215. A single soft buffer for all A subframes 215 may be used, where HARQ feedback can be done in one subframe. That is, a single HARQ process for all A subframes 215 may be used.

In some cases, the interference characteristics of A subframes 215 may be different than other DL or UL subframes. As a result, the intended operation for A subframes may be exchanged among cells for efficient inter-cell interference coordination, which may include a modification of the subframes that may be used for A subframes 215, potential structure(s) of A subframes 215, etc. The embodiments may be applied to flexible duplexing in frequency division duplexing (FDD). That is, the UL subframes used for DL transmissions in FDD may adopt similar configurations and techniques as discussed above.

Figure 3:
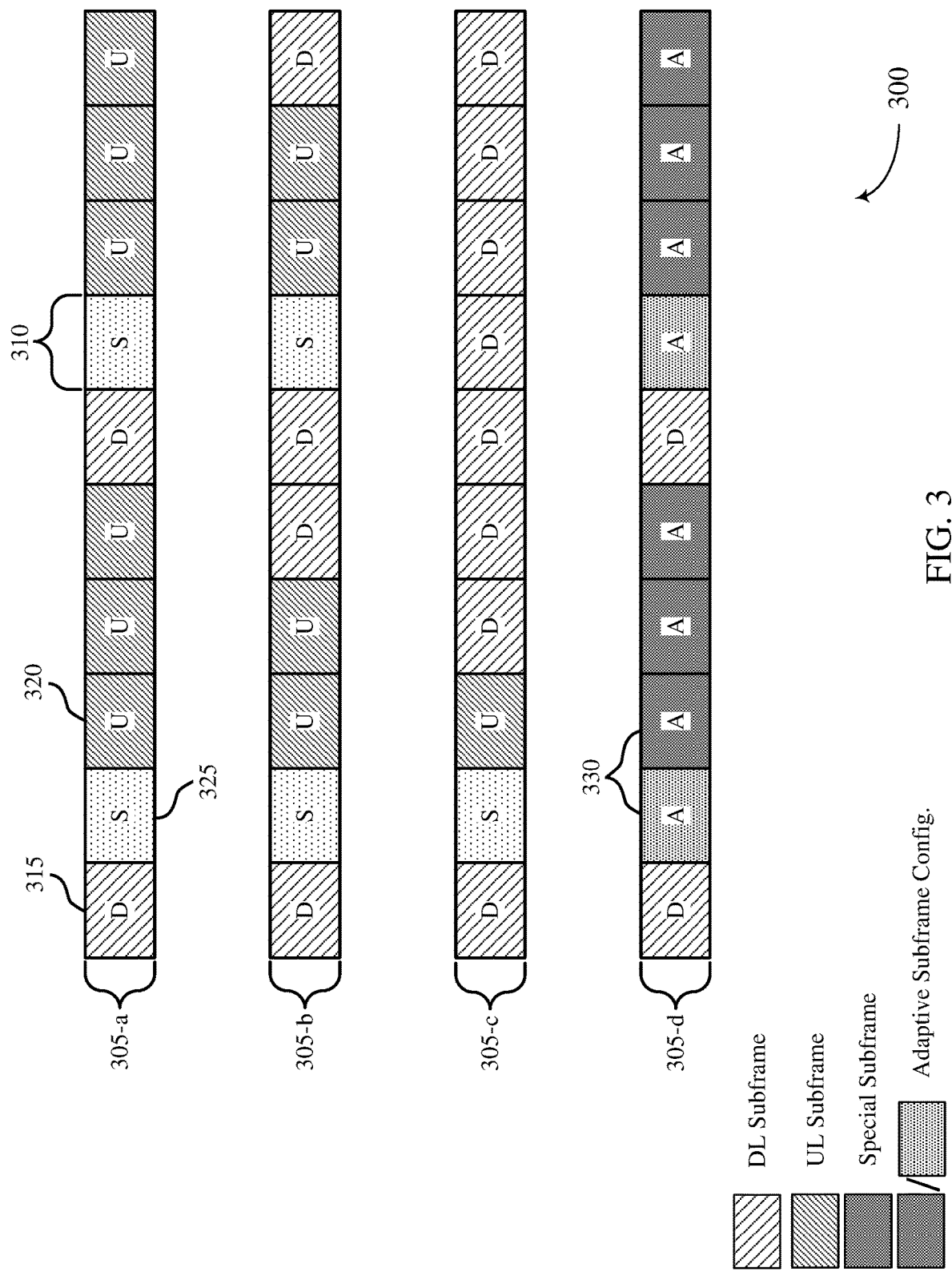
FIG. 3 illustrates an example of a flexible TDD subframe structure with latency reduction in accordance with aspects of the present disclosure.

FIG. 3 illustrates an example of subframe configuration 300 for flexible TDD subframe structure with latency reduction. In some cases, subframe configuration 300 may represent aspects of techniques performed by a UE 115 or base station 105 as described with reference to FIGS. 1-2. FIG. 3 describes various subframe configurations used for TDD communications which may be used in conjunction with adaptive subframes.

Some wireless communication systems may use various frame structures for communication using TDD. Each frame, such as frame 305-a, may have different configurations of subframes 310, where each subframe 310 may be designated as a DL subframe 315, an UL subframe 320, or a special subframe 325. In some cases, the subframe configuration may include more subframes associated with UL traffic as in frame 305-a, include an equal number of DL subframes 315 and UL subframes 320 as in frame 305-b, or may predominantly include DL subframes 320 as in frame 305-c. Each subframe configuration 300 may be associated with a different switching periodicity.

A subframe configuration 300 may also include an adaptive subframe (e.g., A subframe 330), such as in frame 305-d. The structure of A subframe 330 may be dependent on the subframe structure in some legacy wireless communications systems. For example, symbols within A subframe 330 may be associated with DwPTS, and the first three symbols in A subframe may be associated with DL traffic. However, A subframe 330 may have different structure based on a corresponding UL, DL, or special subframe. For example, an A subframe 330 may have different configurations based on whether it corresponds to a DL subframe 315, an UL subframe 320, or a special subframe 325. In some cases, A subframe 330 may have a different structure based on the capabilities of a specific UE 115.

Figure 4:
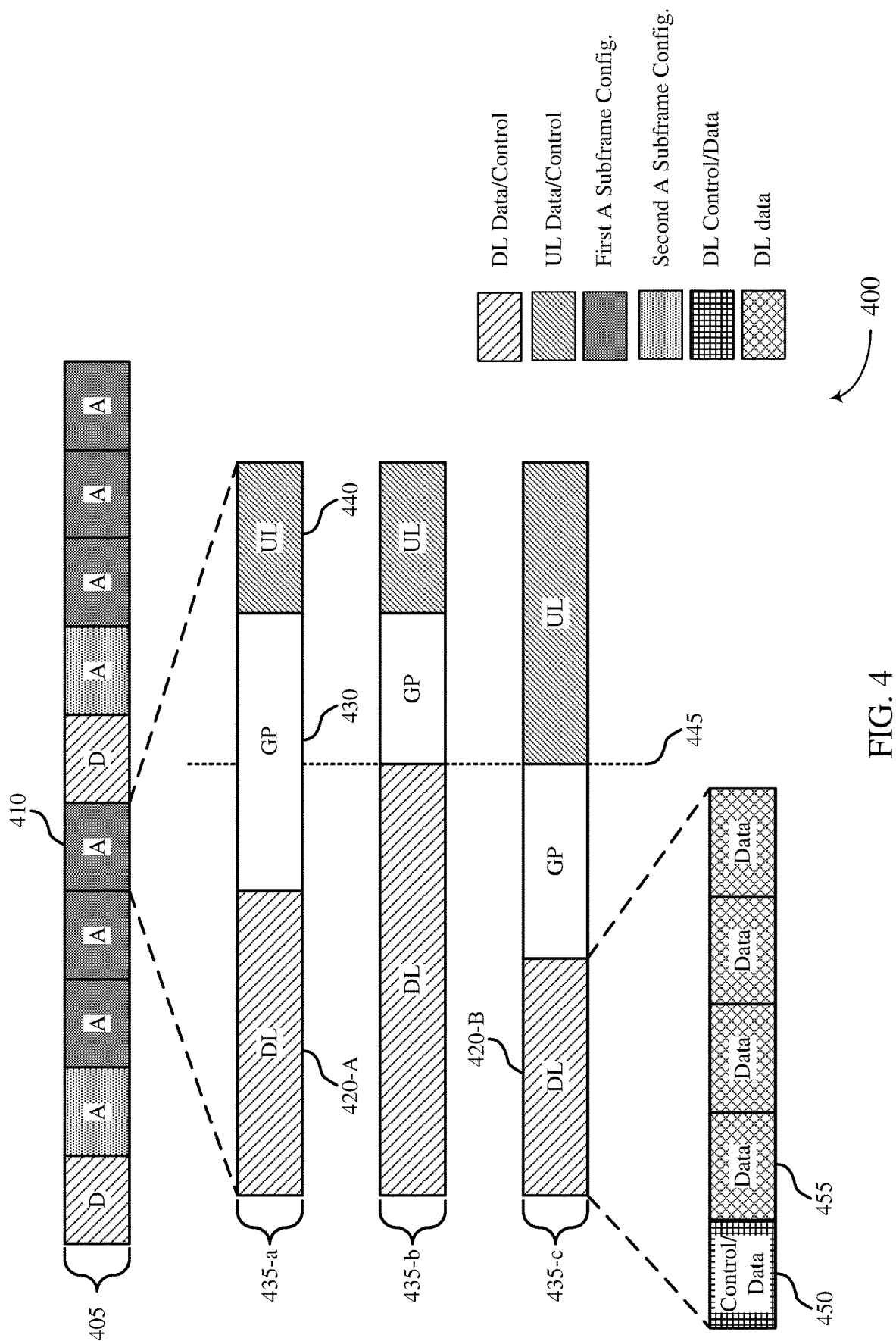
FIG. 4 illustrates an example of a flexible TDD subframe structure with latency reduction in accordance with aspects of the present disclosure.

FIG. 4 illustrates an example of a subframe configuration 400 for flexible TDD subframe structure with latency reduction. In some cases, subframe configuration 400 may represent aspects of techniques performed by a UE 115 or base station 105 as described with reference to FIGS. 1-2. FIG. 4 describes multiple UE-specific subframe structures for different UEs 115 using adaptive subframes.

Different UEs 115 may be associated with different communications conditions due to UE processing capability, channel and/or interference conditions, uplink timing advance, DL/UL traffic, etc. As a result, a frame 405 may include an A subframe 410 that has a UE-specific subframe structure. In such cases, A subframe 410 may be configured for different UE capabilities. That is, the partitioning of a DL region 420-a, GP region 430, and an UL region 440 within the A subframe 410 may be based on parameters specific to a particular UE 115.

For example, a first A subframe structure 435-a may be associated with a first UE 115, where the first UE 115 may have a reduced processing capability and/or large uplink timing advance and may be associated with a longer GP region 430. A second A subframe structure 435-b may be associated with a second UE 115, where the second UE 115 may have relatively greater processing capabilities and/or small uplink timing advance and use a shorter GP region 430. A third A subframe structure 435-c may be associated with a third UE 115 and a longer UL region 440 for an improved UL budget and/or more UL data transmission opportunities, in some examples by enabling simultaneous DL and UL data transmission opportunities in a same subframe. In some cases, the scheduled transmissions for different UEs may overlap. However, a transition time 445 may be selected such that the adaptive subframe structures may avoid simultaneous transmissions in different directions. Although not shown, it is also noted the number of switching points (from DL to UL and vice versa), facilitated by GP, may be more than one, in which case there may be more than one GP.

In some cases, control channel information may be included in the first symbols of the A subframe 410. For example, a DL region 420-b may include a control/data symbols 450 followed by data symbols 455, where there may be support for PDCCH in the control/data symbols. The control information may dynamically indicate the subframe structure, which may be defined differently for a DL or UL grant (e.g., a DL grant indicates a first structure and an UL grant indicates a second structure). Adaptive subframes 410 may support both PDCCH and ePDCCH, where ePDCCH may be supported only for UL grants.

Figure 5A:
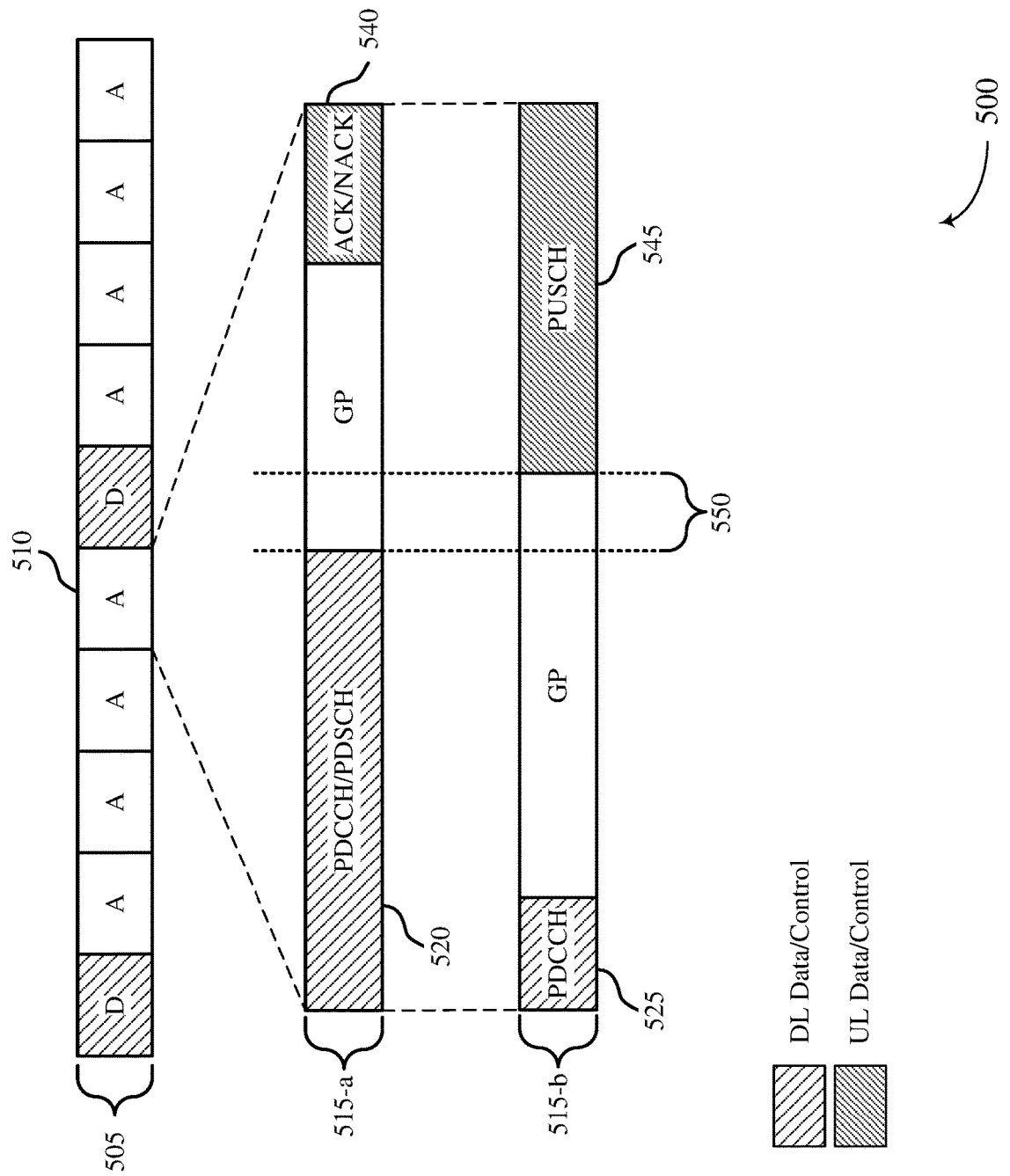
FIGS. 5A and 5B illustrate an examples of a flexible TDD subframe structure or structures with latency reduction in accordance with aspects of the present disclosure.

FIG. 5A illustrates an example of a subframe configuration 500 for a flexible TDD subframe structure with latency reduction. In some cases, subframe configuration 500 may represent aspects of techniques performed by a UE 115 or base station 105 as described with reference to FIGS. 1-2. FIG. 5A describes an example of using multiple adaptive subframe structures when communicating with a single UE 115.

In the subframe configuration 500, a UE 115 may be scheduled with two or more different structures within a single adaptive subframe. For example, a frame 505 may include an A subframe 510 that includes a first structure 515-a and a second structure 515-b for a UE 115. The first structure 515-a may include a DL control and/or data region 520 (e.g., PDCCH and/or PUCCH) and an UL control region 540 (e.g., ACK/NACK). The second structure 515-b may include a DL control region 525 and an UL data region 545. UCI, such as ACK/NACK, may begin in a different symbol and may be associated with different durations. In such cases, the UE 115 may have both DL and UL data, and the processing time between PDSCH and the corresponding HARQ ACK/NACK response may be greater than the processing time between from the UL grant and the corresponding PUSCH. A common GP region 550 may be present with the two structures to accommodate UL/DL switching, UL timing advance, and the like.

Figure 5B:
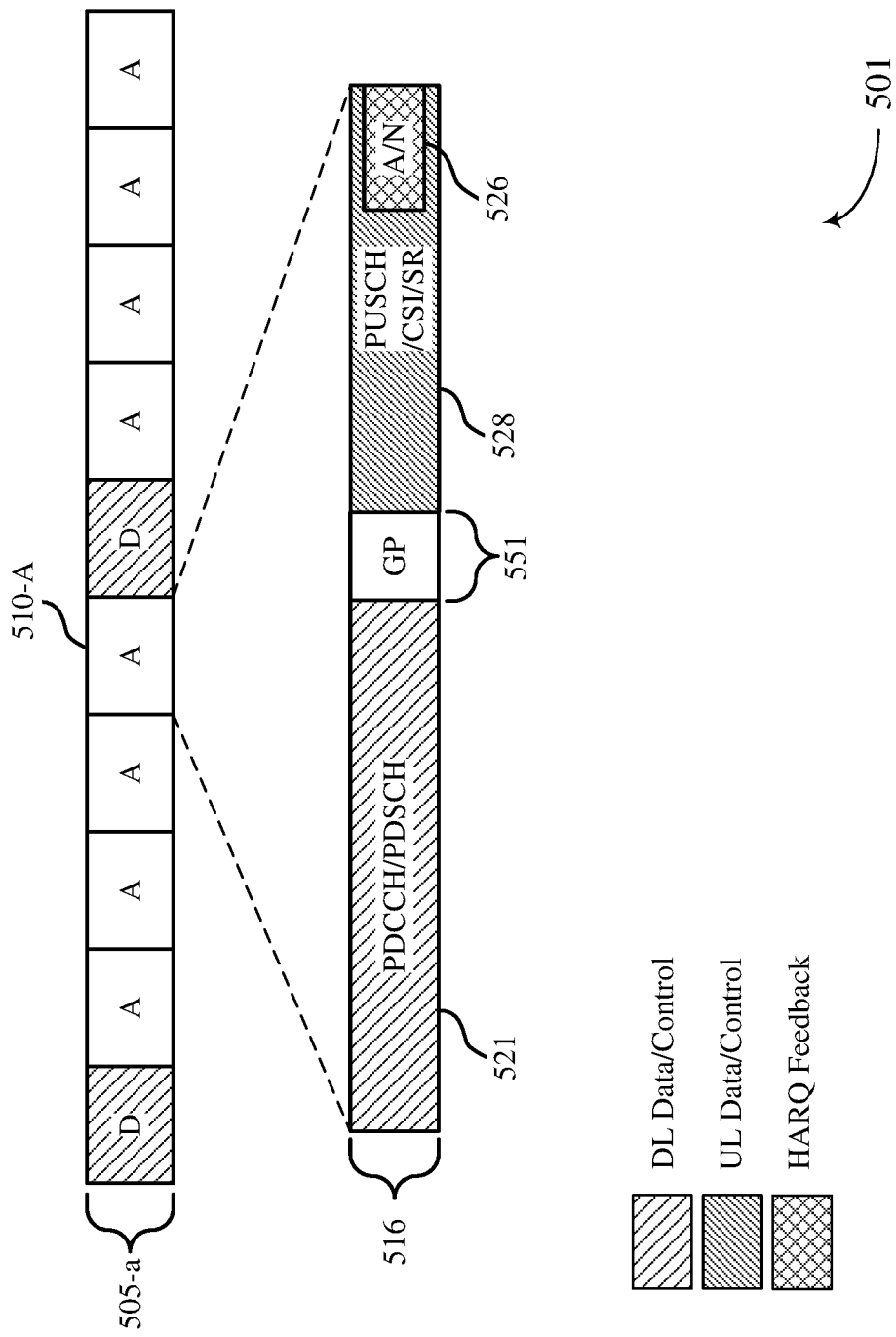

FIG. 5B illustrates an example of a subframe configuration 501 for a flexible TDD subframe structure with latency reduction. In some cases, subframe configuration 501 may represent aspects of techniques performed by a UE 115 or base station 105 as described with reference to FIGS. 1-2. FIG. 5B illustrates an example of using an adaptive subframe structure in which HARQ feedback from a UE 115 begins later in the subframe than UL data and other control information for the UE 115.

By way of example, a frame 505-*a* may include an A subframe 510-*a* that includes a structure 516 for a UE 115. The structure 516 may include a DL control and/or data region 521 (e.g., PDCCH and/or PDSCH) and an UL data/control region 528, which may include ACK/NACK 526, and guard period 551. In some cases, the different UCI may have different starting symbols in a subframe structure 516. For example, ACK/NACK 526 may begin at a different symbol with A subframe 510-*a* than data, P-CSI, or an SR transmitted in UL data/control region 528. As mentioned above, A-CSI, for example, may begin later than the PUSCH due to the more complicated measurement and preparation associated with CSI feedback. In some cases, transmission of UCI can be in a separate PUCCH or may be piggybacked on the PUSCH. Thus, if the PUCCH is used for carrying ACK/NACK 526, PUCCH may start from a symbol different than that of PUSCH.

Figure 6:
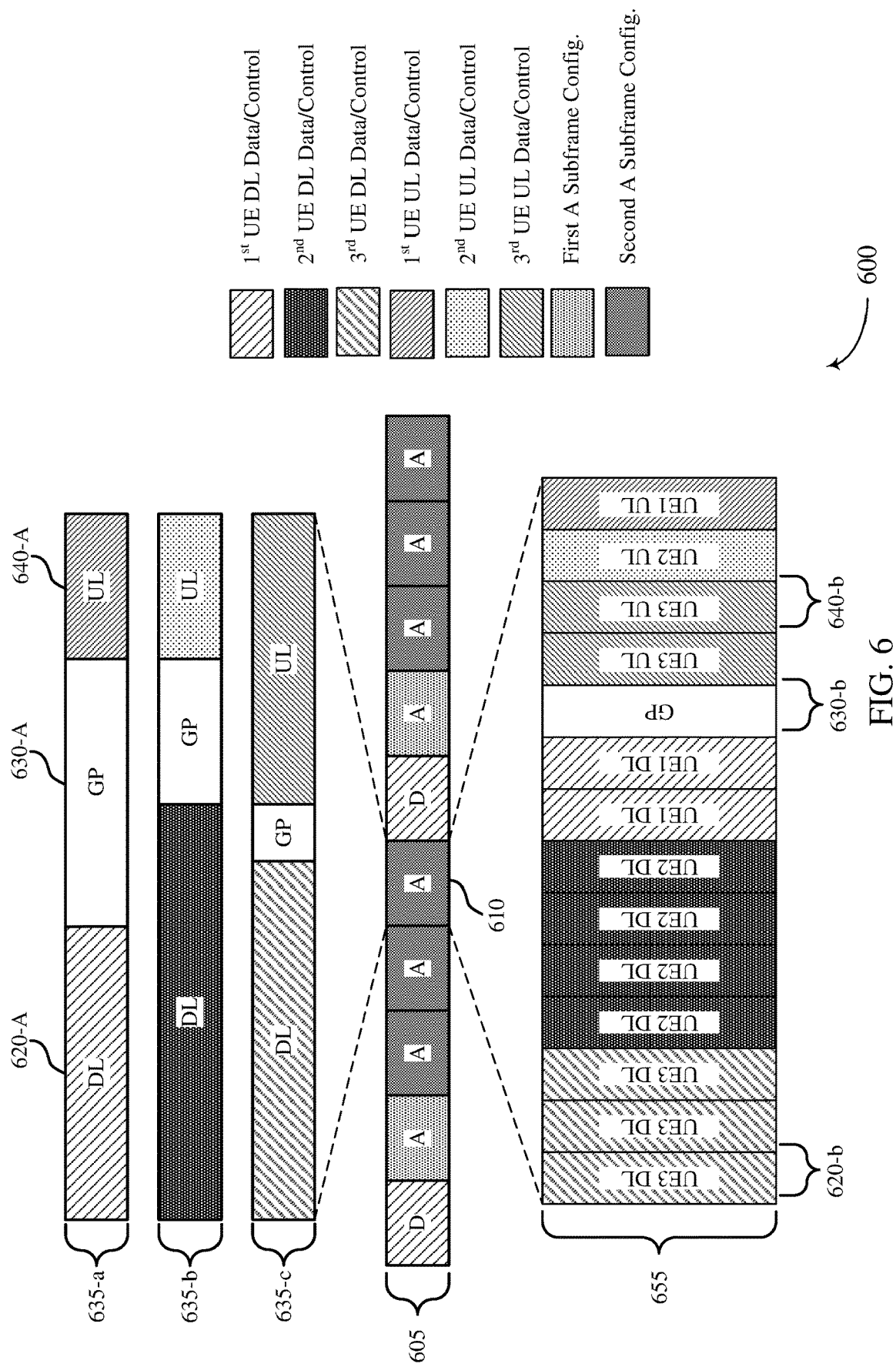
FIG. 6 illustrates an example of a flexible TDD subframe structure with latency reduction in accordance with aspects of the present disclosure.

FIG. 6 illustrates an example of a subframe configuration employing time division multiplexing (TDM) 600 for flexible TDD subframe structure with latency reduction. In some cases, subframe configuration employing TDM 600 may represent aspects of techniques performed by a UE 115 or base station 105 as described with reference to FIGS. 1-2. FIG. 6 describes a subframe structure used for TDM for communication with multiple UEs 115.

In some cases, an A subframe may be used when using TDM for multiplexing UEs 115, where each UE 115 may be associated with a different GP duration. That is, the guard duration (e.g., GP region 630-*a*) experienced by each UE 115 may depend on which symbol the guard period is scheduled in (e.g., whether is scheduled within a DL region 620-*a* or UL region 640-*a* of an adaptive subframe by affect the manner in which a given UE 115 treats the guard period). For example, a frame 605 may include an A subframe 610 that is multiplexed for three UEs 115. Each UE 115 may be associated with different subframe structures (e.g. subframe structures 635-*a*, 635-*b*, and 635-*c*) that include different durations of a DL region 620-*a*, GP region 630-*a*, and UL region 640-*a*.

That is, the A subframe 610 may be transmitted using a subframe structure 655, where the DL regions 620-*b* for each UE occupy one or more symbols at the beginning of the A subframe 610. Similarly, UL regions 640-*b* for each UE may occupy one or more symbols at the end of the A subframe 610, where the DL regions 620-*b* and UL regions 640-*b* may be separated by a GP region 630-*b*. In some cases, symbols from DL region 620-*b* or UL region 640-*b* may appear to part of the GP region 630-*b* if they are scheduled for use by another UE 115. As an example, as shown in the FIG. 6, UE3 may have an effective GP of 7 symbols between the end of its DL transmission and the start of its UL transmission, although there is only one-symbol GP from a cell perspective. Similarly, UE2 may have an effective GP of 5 symbols, while UE1 may have an effective GP of 4 symbols. Such distinction of different effective GPs for different UEs may help address different characteristics (such as processing capability, uplink timing advance, etc.) associated with different UEs. For example, UE1 may be a cell-center UE associated with a small uplink timing advance, and consequently, can tolerate a small effective GP (4 symbols in this example). On the contrary, UE3 may be a cell-edge UE associated with a large uplink timing advance, and consequently, requires a large effective GP (7 symbols in this example).

Figure 7:
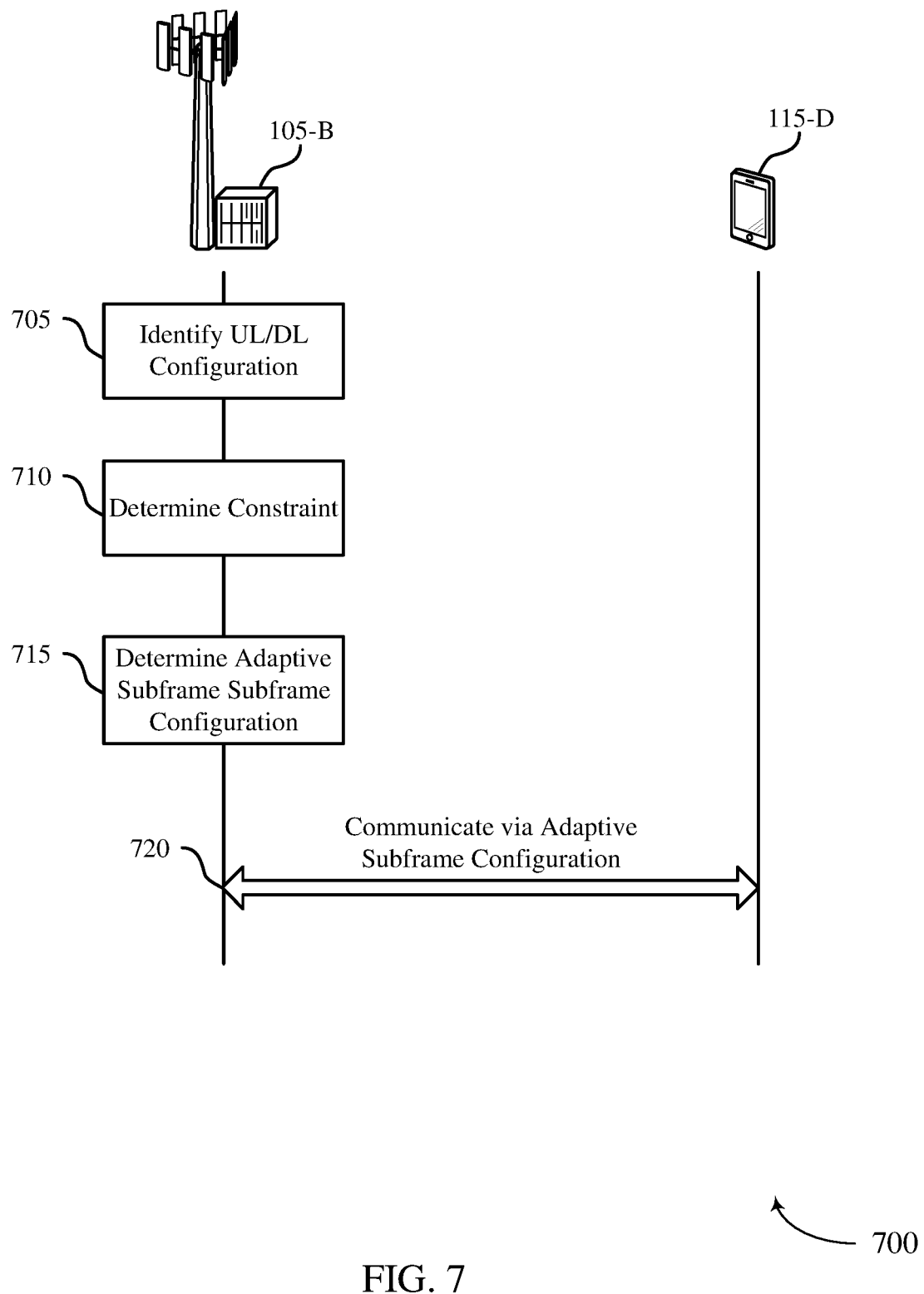
FIG. 7 illustrates an example of a process flow in a system that supports flexible TDD subframe structure with latency reduction in accordance with aspects of the present disclosure.

FIG. 7 illustrates an example of a process flow 700 for flexible TDD subframe structure with latency reduction in accordance with various aspects of the present disclosure. Process flow 700 may include base station 105-*a* and UE 115-*a*, which may be examples of the corresponding devices described with reference to FIG. 1-2.

At step 705, base station 105-*b* may identify an uplink/downlink configuration which defines subframe configuration options for each subframe of a frame. In some cases, the subframe configuration options include an uplink subframe configuration, a downlink subframe configuration, or a special subframe configuration for each subframe of the frame.

At step 710, base station 105-*b* may determine a constraint for a subframe of the frame based on the first uplink/downlink configuration. In some cases, the constraint is based on a CRS transmission or a MBMS transmission when the uplink/downlink configuration for the subframe is a downlink subframe configuration. The constraint may be based on a synchronization signal when the uplink/downlink configuration for the subframe is a special subframe configuration.

The constraint may also be based on a SRS transmission when the uplink/downlink configuration for the subframe is an uplink subframe configuration. In some cases, the uplink/downlink configuration is identified based in part on reception of at least one of system information, an enhanced interference management and traffic adaptation (eIMTA) indication, or a downlink HARQ reference configuration, or any combination thereof.

At step 715, base station 105-*b* may determine an adaptive subframe configuration for the subframe based on the constraint, where the adaptive subframe configuration includes at least one downlink symbol period and at least one uplink symbol period. In some cases, the adaptive subframe configuration includes two or more symbol partitions corresponding to a set of UEs. Each symbol partition may include a downlink portion, an uplink portion, and a guard period, and where the downlink portion for each partition ends before an uplink portion of another symbol partition begins. In some cases, each symbol partition is based on a UE processing capability, a link budget, an uplink timing advance, or a proportion of uplink data to downlink data for a corresponding UE of the set of UEs.

In some cases, the adaptive subframe configuration may include a first set of symbol partitions for a downlink operation and a second set of symbol partitions for an uplink operation. The adaptive subframe configuration may also include two or more different starting symbols, where each starting symbol is associated with a type of uplink control information (UCI) or an uplink shared data. In some cases, the adaptive subframe configuration includes an uplink control channel and an uplink data channel, an uplink data portion and HARQ feedback portion, and a frequency division multiplexing (FDM) configuration or a time division multiplexing (TDM) configuration, or a combination thereof. In some examples, a downlink portion of the adaptive subframe configuration includes at least one control channel symbol period and at least one data channel symbol period. In some cases, a downlink grant indicates a first structure of the adaptive subframe configuration and an uplink grant indicates a second structure the adaptive subframe configuration.

In some cases, the adaptive subframe configuration includes a reference signal configuration, and where each reference signal of the reference signal configuration is substantially located in the beginning the subframe. The reference signal configuration may include a channel state information reference signal (CSI-RS) configuration, where the CSI-RS configuration is dynamically or semi-statically indicated. The reference signal configuration may also include a CSI feedback configuration, and where the CSI feedback configuration is separate from a downlink CSI feedback configuration associated with a downlink subframe of the frame.

In some examples, the adaptive subframe configuration is associated with a TBS scaling parameter for at least one of a downlink operation or an uplink operation, where the TBS scaling parameter is determined based on the adaptive subframe configuration. The adaptive subframe configuration may be associated with a HARQ process that is different from a set of HARQ process associated with a downlink subframe, a special subframe, or an uplink subframe of the frame, where the HARQ process of the adaptive subframe configuration includes a single subframe HARQ process.

In some examples, the adaptive subframe configuration is associated with a first portion of a soft buffer that is different from a second portion of the soft buffer associated with the uplink/downlink configuration, where the adaptive subframe configuration may be associated with a same soft buffer as the uplink/downlink configuration. In some cases, base station 105-*b* may exchange, with another base station 105 of a wireless network, interference statistics for the adaptive subframe configuration in relation to another subframe of the frame.

At step 720, base station 105-*b* may communicate with UE 115-*d* during the subframe according to the adaptive subframe configuration. In some examples, base station 105-*b* may transmit an indication of the adaptive subframe configuration to one or more UEs 115. UE 115-*d* may receive an indication of the adaptive subframe configuration from base station 105-*b*, where the adaptive subframe configuration determination is based on the indication.

Figure 8:
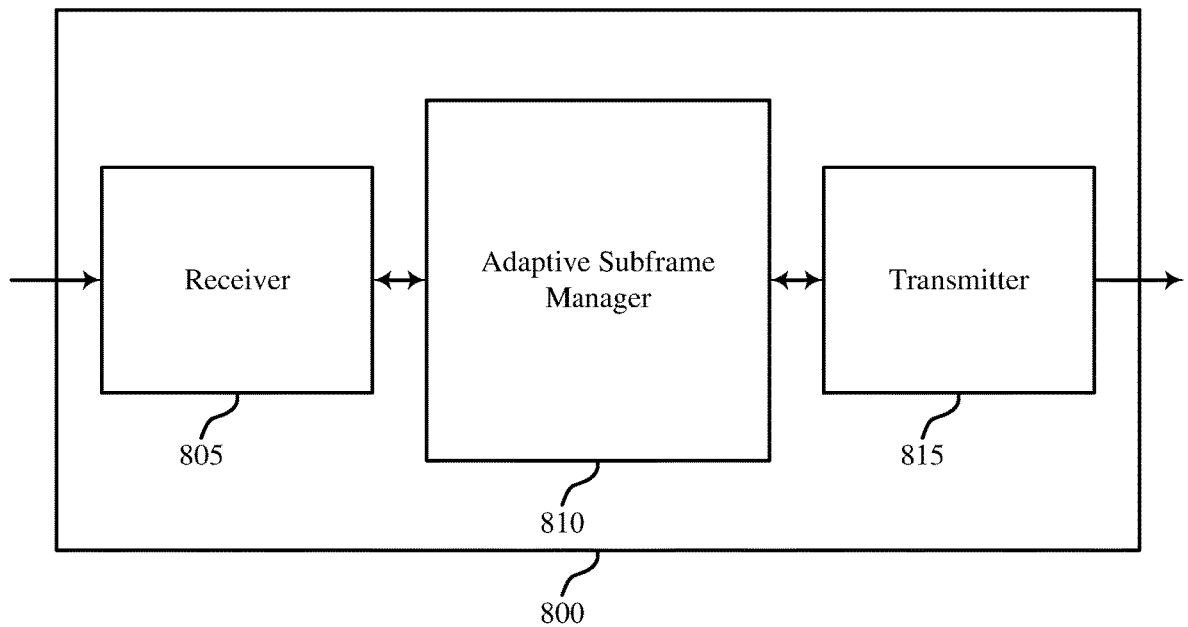
FIGS. 8 through 10 show block diagrams of a wireless device or devices that support flexible TDD subframe structure with latency reduction in accordance with aspects of the present disclosure.

FIG. 8 shows a block diagram of a wireless device 800 that supports flexible TDD subframe structure with latency reduction in accordance with various aspects of the present disclosure. Wireless device 800 may be an example of aspects of a UE 115 or base station 105 described with reference to FIGS. 1 and 2. Wireless device 800 may include receiver 805, adaptive subframe manager 810 and transmitter 815. Wireless device 800 may also include a processor. Each of these components may be in communication with each other.

The receiver 805 may receive information such as packets, user data, or control information associated with various information channels (e.g., control channels, data channels, and information related to flexible TDD subframe structure with latency reduction, etc.). Information may be passed on to other components of the device. The receiver 805 may be an example of aspects of the transceiver 1125 described with reference to FIG. 11.

The adaptive subframe manager 810 may identify a first uplink/downlink configuration which defines subframe configuration options for each subframe of a frame, determine a constraint for a subframe of the frame based on the first uplink/downlink configuration, determine an adaptive subframe configuration for the subframe based on the constraint, where the adaptive subframe configuration includes at least one downlink symbol period and at least one uplink symbol period, and communicate during the subframe according to the adaptive subframe configuration. The adaptive subframe manager 810 may also be an example of aspects of the adaptive subframe manager 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas.

Figure 9:
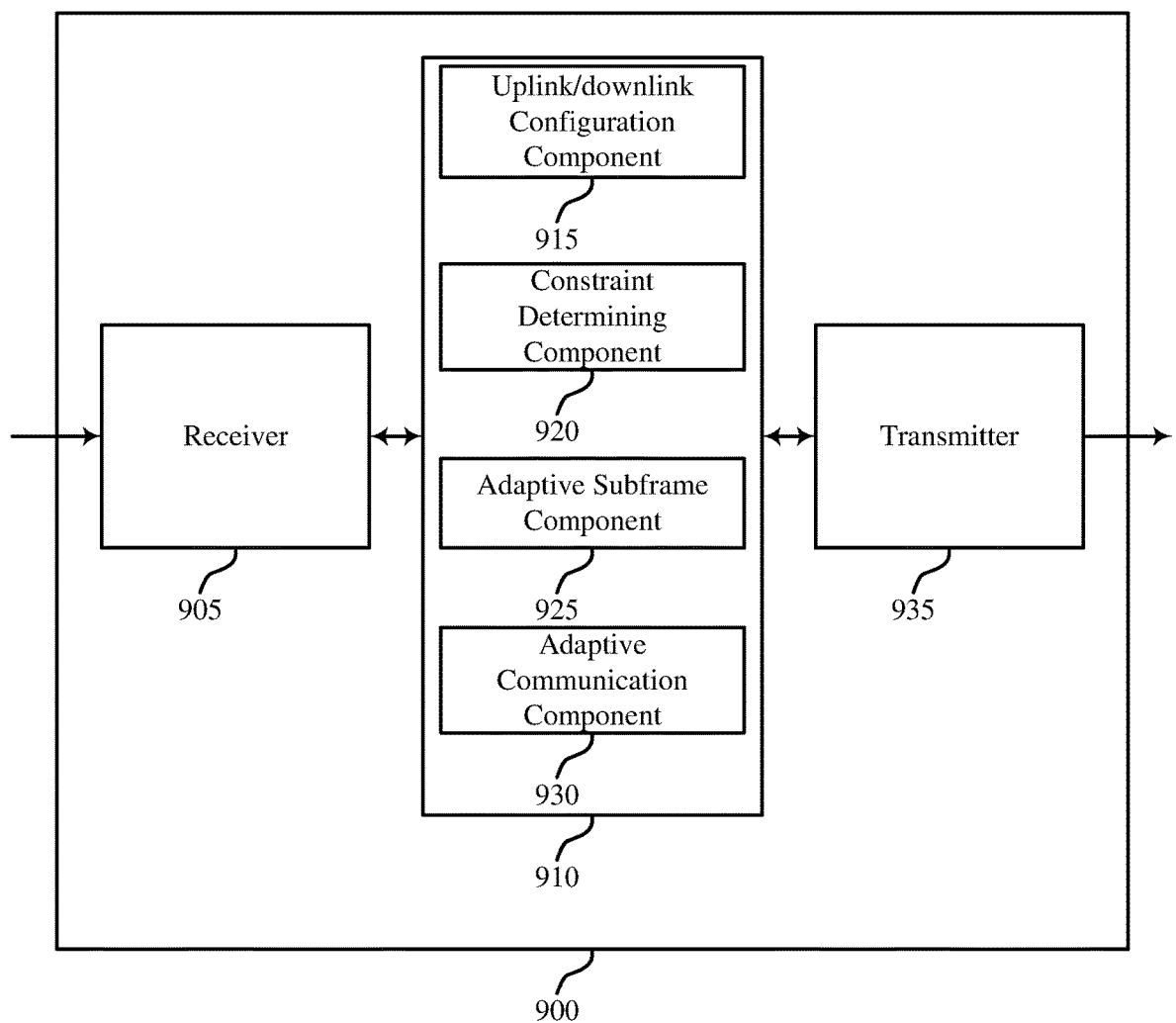

FIG. 9 shows a block diagram of a wireless device 900 that supports flexible TDD subframe structure with latency reduction in accordance with various aspects of the present disclosure. Wireless device 900 may be an example of aspects of a wireless device 800 or a UE 115 or base station 105 described with reference to FIGS. 1, 2, and 8. Wireless device 900 may include receiver 905, adaptive subframe manager 910 and transmitter 935. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The adaptive subframe manager 910 may be an example of aspects of an adaptive subframe manager 810 described with reference to FIG. 8. The adaptive subframe manager 910 may include uplink/downlink configuration component 915, constraint determining component 920, adaptive subframe component 925 and adaptive communication component 930. The adaptive subframe manager 910 may be an example of aspects of the adaptive subframe manager 1105 described with reference to FIG. 11.

The uplink/downlink configuration component 915 may identify a first uplink/downlink configuration which defines subframe configuration options for each subframe of a frame. In some cases, the uplink/downlink configuration may be identified based in part on reception of at least one of system information, an enhanced interference management and traffic adaptation (eIMTA) indication, or a downlink hybrid automatic repeat request reference configuration, or any combination thereof. In some cases, the subframe configuration options include an uplink subframe configuration, a downlink subframe configuration, or a special subframe configuration for each subframe of the frame.

The constraint determining component 920 may determine a constraint for a subframe of the frame based on the first uplink/downlink configuration. In some cases, the constraint is based on a cell-specific reference signals transmission or a multimedia broadcast multicast service transmission when the uplink/downlink configuration for the subframe is a downlink subframe configuration. In some cases, the constraint is based on a synchronization signal when the uplink/downlink configuration for the subframe is a special subframe configuration. In some cases, the constraint is based on a sounding reference signal transmission when the uplink/downlink configuration for the subframe is an uplink subframe configuration.

The adaptive subframe component 925 may determine an adaptive subframe configuration for the subframe based on the constraint, where the adaptive subframe configuration includes at least one downlink symbol period and at least one uplink symbol period. In some cases, the adaptive subframe configuration includes two or more symbol partitions corresponding to a set of UEs. In some cases, each symbol partition includes a downlink portion, an uplink portion, and a guard period, and where the downlink portion for each partition ends before an uplink portion of another symbol partition begins.

In some cases, each symbol partition is based on a UE processing capability, a link budget, an uplink timing advance, or a proportion of uplink data to downlink data for a corresponding user equipment of the set of UEs. In some cases, the adaptive subframe configuration includes a first set of symbol partitions for a downlink operation and a second set of symbol partitions for an uplink operation. In some cases, the adaptive subframe configuration includes two or more different starting symbols, where each starting symbol is associated with a type of uplink control information (UCI) or an uplink shared data.

In some cases, the adaptive subframe configuration includes an uplink control channel and an uplink data channel. In some cases, the adaptive subframe configuration includes an uplink data portion and hybrid automatic repeat request feedback portion. In some cases, the adaptive subframe configuration includes a frequency division multiplexing configuration or a time division multiplexing configuration, or a combination thereof. In some cases, a downlink portion of the adaptive subframe configuration includes at least one control channel symbol period and at least one data channel symbol period.

In some cases, a downlink grant indicates a first structure of the adaptive subframe configuration and an uplink grant indicates a second structure the adaptive subframe configuration. In some cases, the adaptive subframe configuration is associated with a TBS scaling parameter for at least one of a downlink operation or an uplink operation, where the TBS scaling parameter is determined based on the adaptive subframe configuration. In some cases, the adaptive subframe configuration is associated with a first portion of a soft buffer that is different from a second portion of the soft buffer associated with the uplink/downlink configuration. In some cases, the adaptive subframe configuration is associated with a same soft buffer as the uplink/downlink configuration.

The adaptive communication component 930 may communicate during the subframe according to the adaptive subframe configuration.

The transmitter 935 may transmit signals received from other components of wireless device 900. In some examples, the transmitter 935 may be collocated with a receiver in a transceiver module. For example, the transmitter 935 may be an example of aspects of the transceiver 1125 described with reference to FIG. 11. The transmitter 935 may utilize a single antenna, or it may utilize a plurality of antennas.

Figure 10:
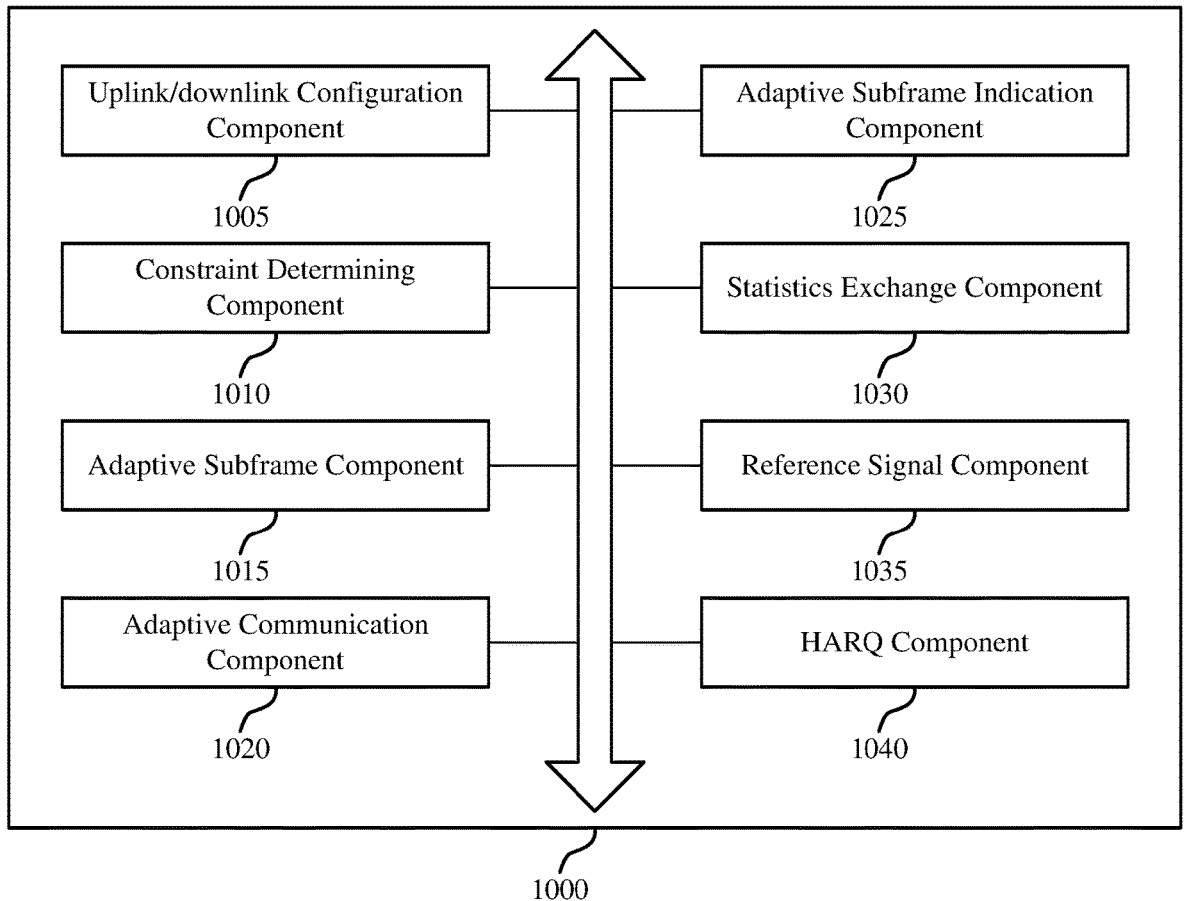

FIG. 10 shows a block diagram of an adaptive subframe manager 1000 which may be an example of the corresponding component of wireless device 800 or wireless device 900. That is, adaptive subframe manager 1000 may be an example of aspects of adaptive subframe manager 810 or adaptive subframe manager 910 described with reference to FIGS. 8 and 9. The adaptive subframe manager 1000 may also be an example of aspects of the adaptive subframe manager 1105 described with reference to FIG. 11.

The adaptive subframe manager 1000 may include uplink/downlink configuration component 1005, constraint determining component 1010, adaptive subframe component 1015, adaptive communication component 1020, adaptive subframe indication component 1025, statistics exchange component 1030, reference signal component 1035 and HARQ component 1040. Each of these modules may communicate, directly or indirectly, with one another (e.g., via one or more buses).

The uplink/downlink configuration component 1005 may identify a first uplink/downlink configuration which defines subframe configuration options for each subframe of a frame. The constraint determining component 1010 may determine a constraint for a subframe of the frame based on the first uplink/downlink configuration. The adaptive subframe component 1015 may determine an adaptive subframe configuration for the subframe based on the constraint, where the adaptive subframe configuration includes at least one downlink symbol period and at least one uplink symbol period. The adaptive communication component 1020 may communicate during the subframe according to the adaptive subframe configuration.

The adaptive subframe indication component 1025 may transmit (or receive) an indication of the adaptive subframe configuration to one or more UEs. When the indication is received (e.g., by UE 115 from a base station 105), the adaptive subframe configuration determination is based on the indication.

The statistics exchange component 1030 may exchange, with another base station of a wireless network, interference statistics for the adaptive subframe configuration in relation to another subframe of the frame.

The reference signal component 1035 may be configured such that the adaptive subframe configuration includes a reference signal configuration, and where each reference signal of the reference signal configuration is substantially located in the beginning the subframe. In some cases, the reference signal configuration includes a channel state information reference signal (CSI-RS) configuration, where the CSI-RS configuration is dynamically or semi-statically indicated. In some cases, the reference signal configuration includes a channel state information feedback configuration, and where the channel state information feedback configuration is separate from a downlink channel state information feedback configuration associated with a downlink subframe of the frame.

The HARQ component 1040 may be configured such that the adaptive subframe configuration is associated with a hybrid automatic repeat request process that is different from a set of hybrid automatic repeat request process associated with a downlink subframe, a special subframe, or an uplink subframe of the frame. In some cases, the hybrid automatic repeat request process of the adaptive subframe configuration includes a single subframe hybrid automatic repeat request process.

Figure 11:
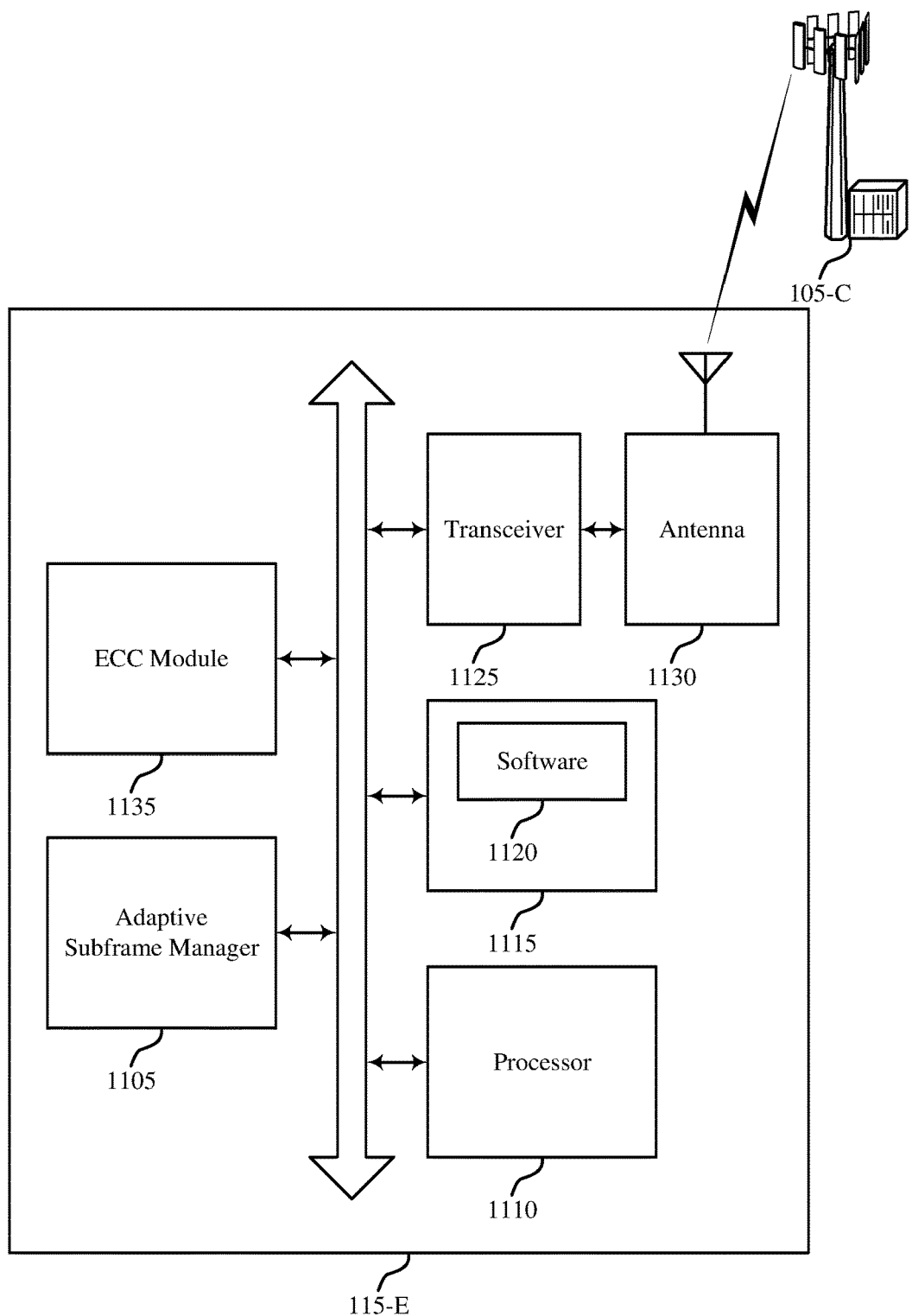
FIG. 11 illustrates a block diagram of a system including a UE that supports flexible TDD subframe structure with latency reduction in accordance with aspects of the present disclosure.

FIG. 11 shows a diagram of a system 1100 including a device that supports flexible TDD subframe structure with latency reduction in accordance with various aspects of the present disclosure. For example, system 1100 may include UE 115-*e*, which may be an example of a wireless device 800, a wireless device 900, or a UE 115 as described with reference to FIGS. 1, 2 and 8 through 10.

UE 115-*e* may also include adaptive subframe manager 1105, processor 1110, memory 1115, transceiver 1125, antenna 1130, and ECC module 1135. Each of these modules may communicate, directly or indirectly, with one another (e.g., via one or more buses). The adaptive subframe manager 1105 may be an example of an adaptive subframe manager as described with reference to FIGS. 8 through 10.

The processor 1110 may include an intelligent hardware device, (e.g., a central processing unit (CPU), a microcontroller, an application specific integrated circuit (ASIC), etc.) The memory 1115 may include random access memory (RAM) and read only memory (ROM). The memory 1115 may store computer-readable, computer-executable software including instructions that, when executed, cause the processor to perform various functions described herein (e.g., flexible TDD subframe structure with latency reduction, etc.). In some cases, the software 1120 may not be directly executable by the processor but may cause a computer (e.g., when compiled and executed) to perform functions described herein.

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

The ECC module 1135 may enable operations using eCCs such as communication using shared or unlicensed spectrum, using reduced TTIs or subframe durations, or using a large number of CCs.

Figure 12:
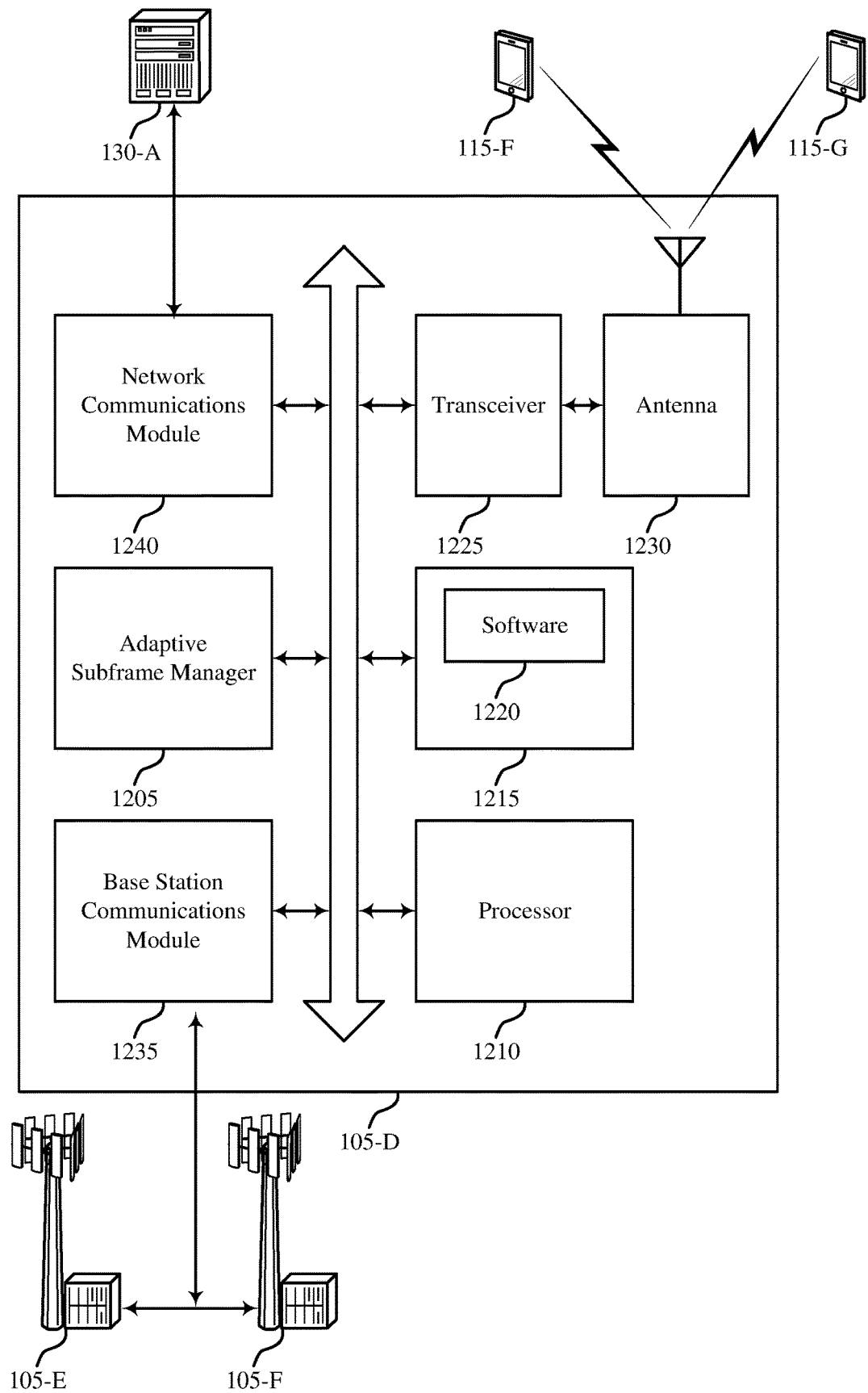
FIG. 12 illustrates a block diagram of a system including a base station that supports flexible TDD subframe structure with latency reduction in accordance with aspects of the present disclosure.

FIG. 12 shows a diagram of a wireless system 1200 including a device configured that supports flexible TDD subframe structure with latency reduction in accordance with various aspects of the present disclosure. For example, system 1200 may include base station 105-*d*, which may be an example of a wireless device 800, a wireless device 900, or a base station 105 as described with reference to FIGS. 1, 2 and 8 through 10. Base station 105-*d* may also include components for bi-directional voice and data communications including components for transmitting communications and components for receiving communications. For example, base station 105-*d* may communicate bi-directionally with one or more UEs 115.

Base station 105-*d* may also include adaptive subframe manager 1205, processor 1210, memory 1215, transceiver 1225, antenna 1230, base station communications module 1235, and network communications module 1240. Each of these modules may communicate, directly or indirectly, with one another (e.g., via one or more buses). The adaptive subframe manager 1205 may be an example of an adaptive subframe manager as described with reference to FIGS. 8 through 10.

The processor 1210 may include an intelligent hardware device, (e.g., a CPU, a microcontroller, an ASIC, etc.) The memory 1215 may include RAM and ROM. The memory 1215 may store computer-readable, computer-executable software including instructions that, when executed, cause the processor to perform various functions described herein (e.g., flexible TDD subframe structure with latency reduction, etc.). In some cases, the software 1220 may not be directly executable by the processor but may cause a computer (e.g., when compiled and executed) to perform functions described herein.

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1130, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
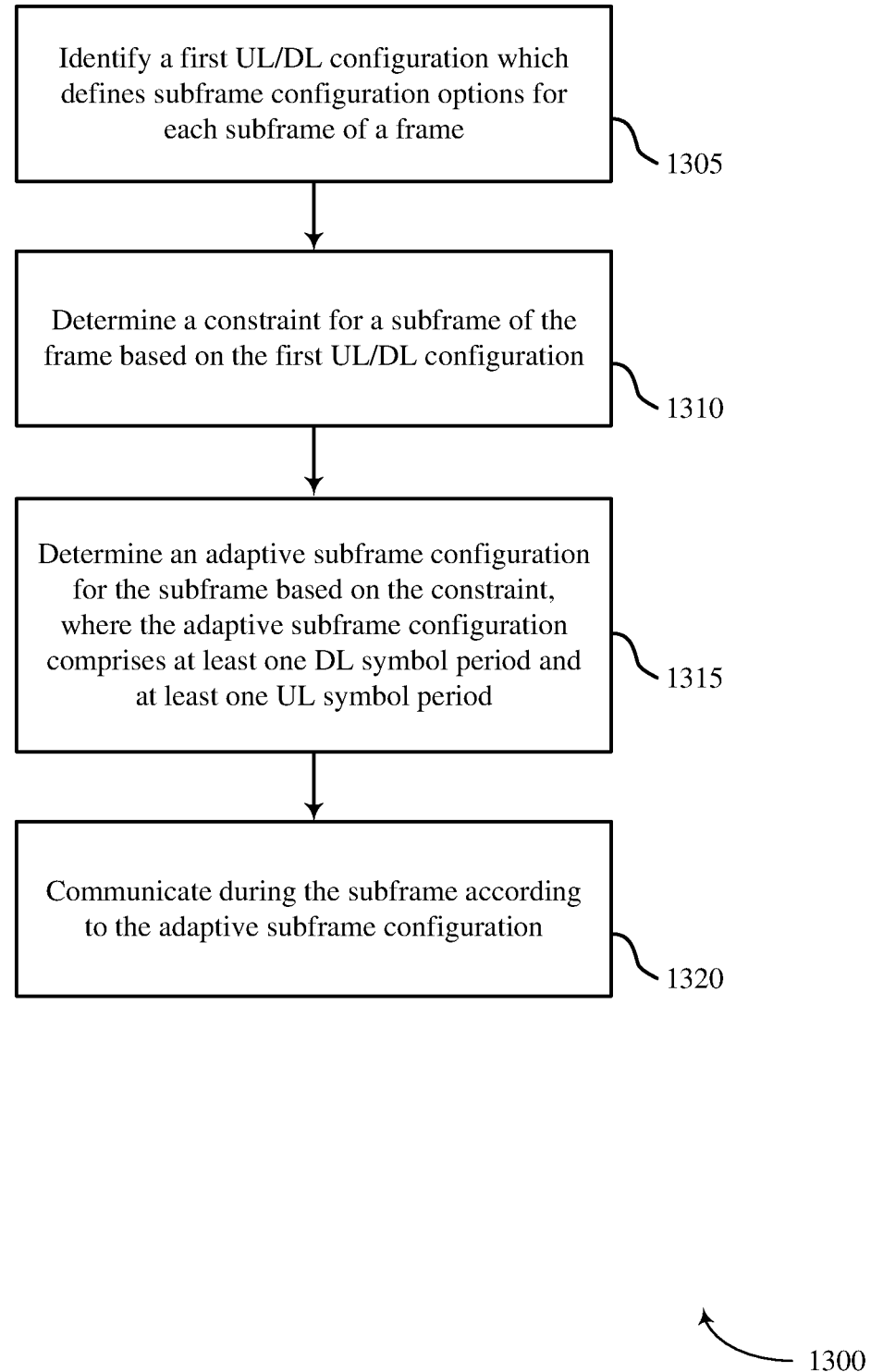
FIGS. 13 through 15 illustrate methods for flexible TDD subframe structure with latency reduction in accordance with aspects of the present disclosure.

FIG. 13 shows a flowchart illustrating a method 1300 for flexible TDD subframe structure with latency reduction in accordance with various aspects of the present disclosure. The operations of method 1300 may be implemented by a UE 115 or base station 105 or its components as described with reference to FIGS. 1 and 2. For example, the operations of method 1300 may be performed by the adaptive subframe manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1305, the UE 115 or base station 105 may identify an UL/DL configuration which defines subframe configuration options for each subframe of a frame as described above with reference to FIGS. 2 through 7. In certain examples, the operations of block 1305 may be performed by the uplink/downlink configuration component as described with reference to FIGS. 9 and 10.

At block 1310, the UE 115 or base station 105 may determine a constraint for a subframe of the frame based on the UL/DL configuration as described above with reference to FIGS. 2 through 7. In certain examples, the operations of block 1310 may be performed by the constraint determining component as described with reference to FIGS. 9 and 10.

At block 1315, the UE 115 or base station 105 may determine an adaptive subframe configuration for the subframe based on the constraint, where the adaptive subframe configuration includes at least one DL symbol period and at least one UL symbol period as described above with reference to FIGS. 2 through 7. In certain examples, the operations of block 1315 may be performed by the adaptive subframe component as described with reference to FIGS. 9 and 10.

At block 1320, the UE 115 or base station 105 may communicate during the subframe according to the adaptive subframe configuration as described above with reference to FIGS. 2 through 7. In certain examples, the operations of block 1320 may be performed by the adaptive communication component as described with reference to FIGS. 9 and 10.

Figure 14:
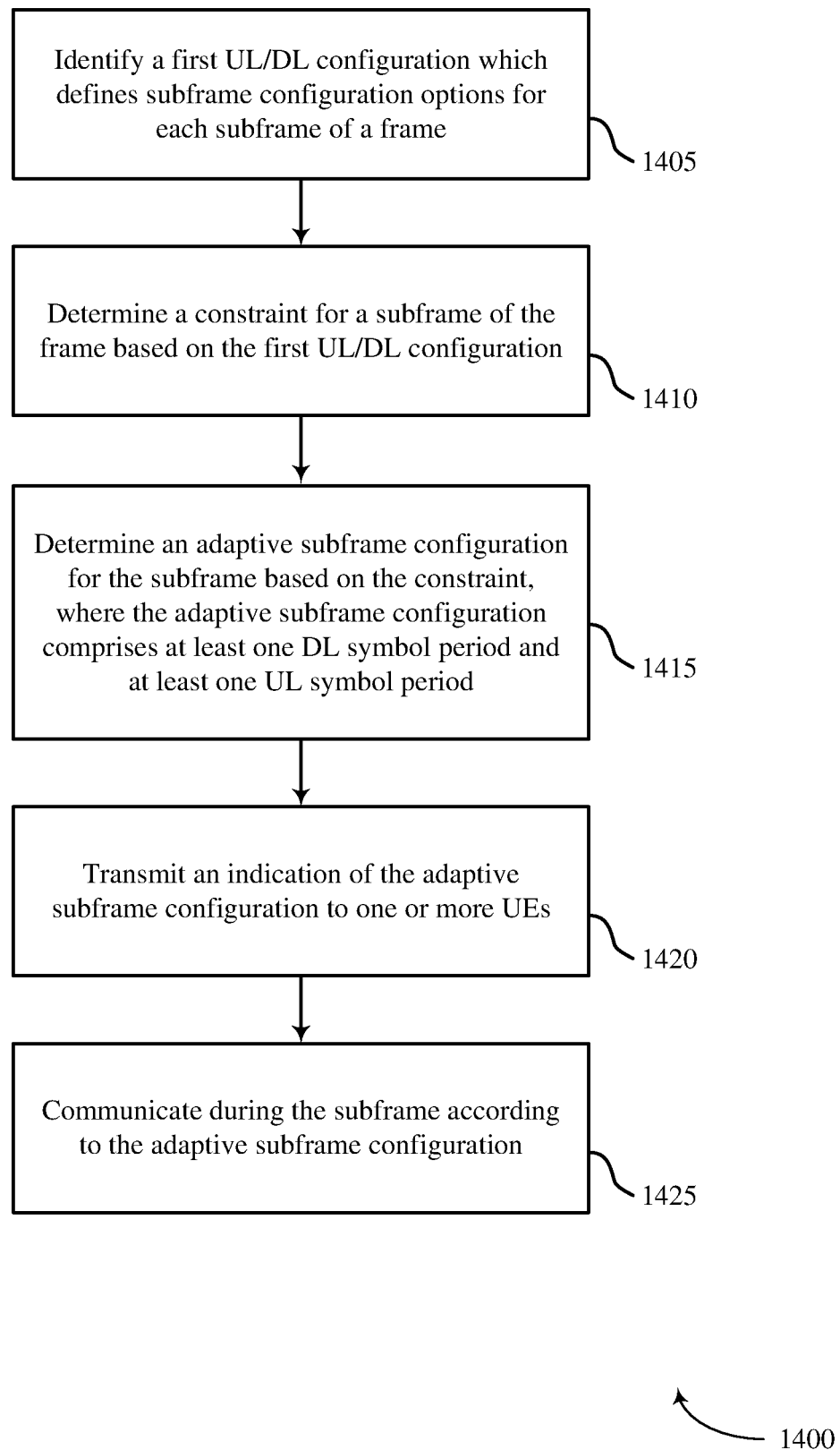

FIG. 14 shows a flowchart illustrating a method 1400 for flexible TDD subframe structure with latency reduction in accordance with various aspects of the present disclosure. The operations of method 1400 may be implemented by a UE 115 or base station 105 or its components as described with reference to FIGS. 1 and 2. For example, the operations of method 1400 may be performed by the adaptive subframe manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1405, the UE 115 or base station 105 may identify an UL/DL configuration which defines subframe configuration options for each subframe of a frame as described above with reference to FIGS. 2 through 7. In certain examples, the operations of block 1405 may be performed by the uplink/downlink configuration component as described with reference to FIGS. 9 and 10.

At block 1410, the UE 115 or base station 105 may determine a constraint for a subframe of the frame based on the UL/DL configuration as described above with reference to FIGS. 2 through 7. In certain examples, the operations of block 1410 may be performed by the constraint determining component as described with reference to FIGS. 9 and 10.

At block 1415, the UE 115 or base station 105 may determine an adaptive subframe configuration for the subframe based on the constraint, where the adaptive subframe configuration includes at least one DL symbol period and at least one UL symbol period as described above with reference to FIGS. 2 through 7. In certain examples, the operations of block 1415 may be performed by the adaptive subframe component as described with reference to FIGS. 9 and 10.

At block 1420, the UE 115 or base station 105 may transmit an indication of the adaptive subframe configuration to one or more UEs as described above with reference to FIGS. 2 through 7. In certain examples, the operations of block 1420 may be performed by the adaptive subframe indication component as described with reference to FIGS. 9 and 10.

At block 1425, the UE 115 or base station 105 may communicate during the subframe according to the adaptive subframe configuration as described above with reference to FIGS. 2 through 7. In certain examples, the operations of block 1425 may be performed by the adaptive communication component as described with reference to FIGS. 9 and 10.

Figure 15:
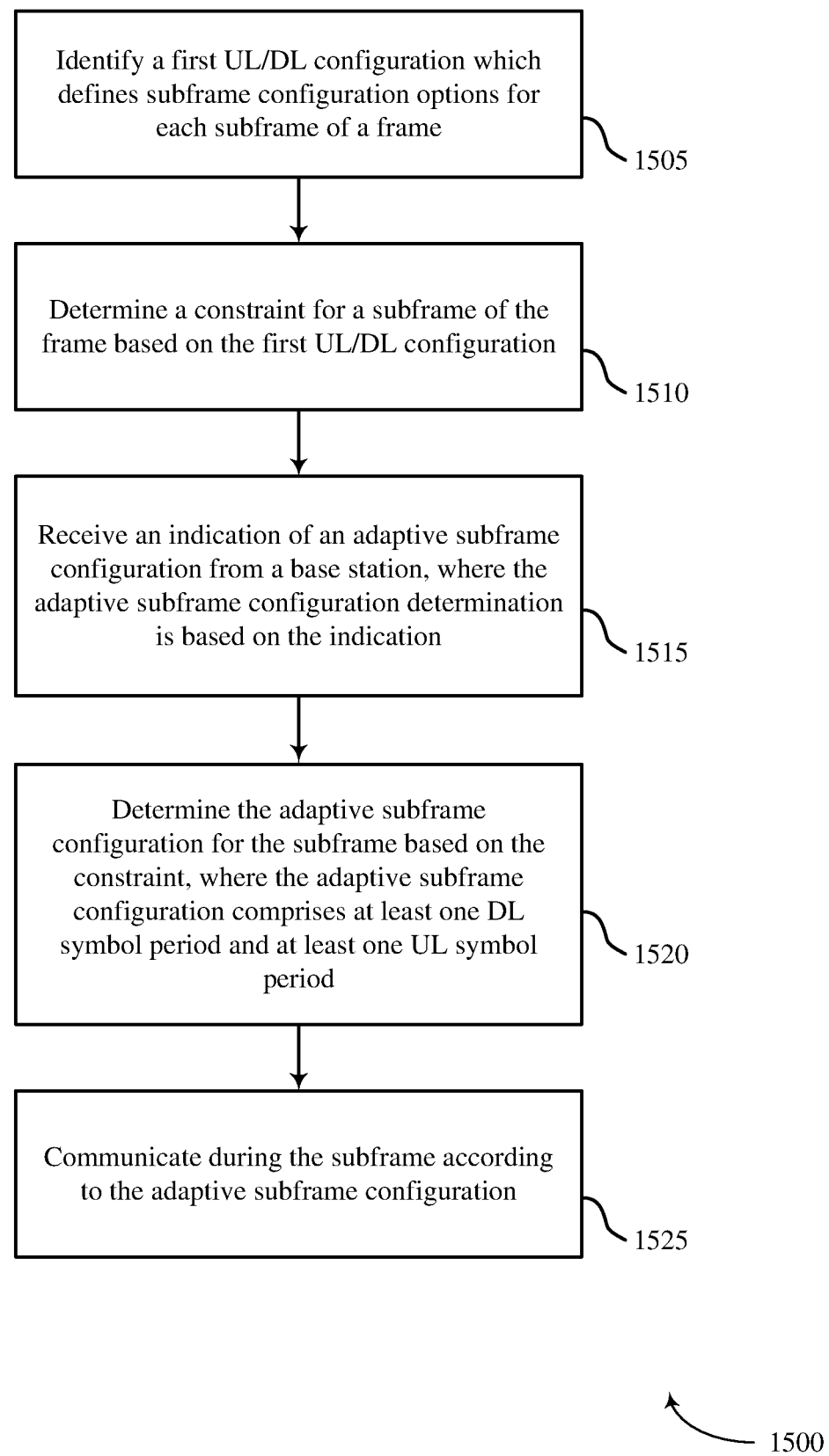

FIG. 15 shows a flowchart illustrating a method 1500 for flexible TDD subframe structure with latency reduction in accordance with various aspects of the present disclosure. The operations of method 1500 may be implemented by a UE 115 or base station 105 or its components as described with reference to FIGS. 1 and 2. For example, the operations of method 1500 may be performed by the adaptive subframe manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1505, the UE 115 or base station 105 may identify an UL/DL configuration which defines subframe configuration options for each subframe of a frame as described above with reference to FIGS. 2 through 7. In certain examples, the operations of block 1505 may be performed by the uplink/downlink configuration component as described with reference to FIGS. 9 and 10.

At block 1510, the UE 115 or base station 105 may determine a constraint for a subframe of the frame based on the UL/DL configuration as described above with reference to FIGS. 2 through 7. In certain examples, the operations of block 1510 may be performed by the constraint determining component as described with reference to FIGS. 9 and 10.

At block 1515, the UE 115 or base station 105 may receive an indication of an adaptive subframe configuration from a base station, where the adaptive subframe configuration determination is based on the indication as described above with reference to FIGS. 2 through 7. In certain examples, the operations of block 1515 may be performed by the adaptive subframe indication component as described with reference to FIGS. 9 and 10.

At block 1520, the UE 115 or base station 105 may determine the adaptive subframe configuration for the subframe based on the constraint (and/or the indication), where the adaptive subframe configuration includes at least one DL symbol period and at least one UL symbol period as described above with reference to FIGS. 2 through 7. In certain examples, the operations of block 1520 may be performed by the adaptive subframe component as described with reference to FIGS. 9 and 10.

At block 1525, the UE 115 or base station 105 may communicate during the subframe according to the adaptive subframe configuration as described above with reference to FIGS. 2 through 7. In certain examples, the operations of block 1525 may be performed by the adaptive communication component as described with reference to FIGS. 9 and 10.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for flexible TDD subframe structure with latency reduction.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

"All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different subcarrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for flexible TDD subframe structure with latency reduction. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one IC. In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a user equipment (UE), comprising:
receiving a first indication of a first communication configuration for a set of transmission time intervals (TTIs), wherein the first communication configuration comprises a respective TTI configuration for each TTI of the set of TTIs, and wherein each respective TTI configuration comprises an uplink (UL) TTI configuration, a downlink (DL) TTI configuration, or a special TTI configuration;
receiving a second indication that indicates an adaptive TTI configuration of a set of adaptive TTI configurations for an adaptive TTI of the set of TTIs, wherein the adaptive TTI configuration comprises at least one of a number of DL symbols, a number of UL symbols, or both based at least in part on the respective TTI configuration corresponding to the adaptive TTI, wherein a structure of the adaptive TTI configuration of the adaptive TTI is dependent on a structure of the respective TTI configuration of the adaptive TTI, and wherein the adaptive TTI configuration of the adaptive TTI is different from the respective TTI configuration of the adaptive TTI; and
communicating according to the adaptive TTI configuration during the adaptive TTI and according to the respective TTI configurations during remaining TTIs of the set of TTIs.

2. The method of claim 1, wherein the first communication configuration is based at least in part on reception of at least one of system information (SI), an enhanced interference management and traffic adaptation (eIMTA) indication, or a DL hybrid automatic repeat request (HARD) reference configuration, or any combination thereof.

3. The method of claim 1, wherein the adaptive TTI configuration comprises a first set of symbol partitions for a DL operation and a second set of symbol partitions for a UL operation.

4. The method of claim 1, wherein the adaptive TTI configuration comprises a UL data portion and a hybrid automatic repeat request (HARQ) feedback portion.

5. The method of claim 1, wherein the adaptive TTI configuration comprises a frequency division multiplexing (FDM) configuration or a time division multiplexing (TDM) configuration, or a combination thereof.

6. The method of claim 1, wherein a first portion of a DL symbol period indicated by the adaptive TTI configuration comprises at least one control channel symbol period and a second portion of the DL symbol period comprises at least one data channel symbol period.

7. The method of claim 1, wherein a grant comprises the second indication of the adaptive TTI configuration.

8. A user equipment (UE), comprising:
means for receiving a first indication of a first communication configuration for a set of transmission time intervals (TTIs), wherein the first communication configuration comprises a respective TTI configuration for each TTI of the set of TTIs, and wherein each respective TTI configuration comprises an uplink (UL) TTI configuration, a downlink (DL) TTI configuration, or a special TTI configuration;
means for receiving a second indication that indicates an adaptive TTI configuration of a set of adaptive TTI configurations for an adaptive TTI of the set of TTIs, wherein the adaptive TTI configuration comprises at least one of a number of DL symbols, a number of UL symbols, or both based at least in part on the respective TTI configuration corresponding to the adaptive TTI, wherein a structure of the adaptive TTI configuration of the adaptive TTI is dependent on a structure of the respective TTI configuration of the adaptive TTI, and wherein the adaptive TTI configuration of the adaptive TTI is different from the respective TTI configuration of the adaptive TTI; and means for communicating according to the adaptive TTI configuration during the adaptive TTI and according to the respective TTI configurations during remaining TTIs of the set of TTIs.

9. A user equipment (UE), comprising:

a processor;

memory coupled with the processor; and instructions stored in the memory and operable, when executed by the processor, to cause the UE to:

receive a first indication of a first communication configuration for a set of transmission time intervals (TTIs), wherein the first communication configuration comprises a respective TTI configuration for each TTI of the set of TTIs, and wherein each respective TTI configuration comprises an uplink (UL) TTI configuration, a downlink (DL) TTI configuration, or a special TTI configuration;

receive a second indication that indicates an adaptive TTI configuration of a set of adaptive TTI configurations for an adaptive TTI of the set of TTIs, wherein the adaptive TTI configuration comprises at least one of a number of DL symbols, a number of UL symbols, or both based at least in part on the respective TTI configuration corresponding to the adaptive TTI, wherein a structure of the adaptive TTI configuration of the adaptive TTI is dependent on a structure of the respective TTI configuration of the adaptive TTI, and wherein the adaptive TTI configuration of the adaptive TTI is different from the respective TTI configuration of the adaptive TTI; and communicate according to the adaptive TTI configuration during the adaptive TTI and according to the respective TTI configurations during remaining TTIs of the set of TTIs.

10. The UE of claim 9, wherein the first communication configuration is based at least in part on reception of at least one of system information (SI), an enhanced interference management and traffic adaptation (eIMTA) indication, or a DL hybrid automatic repeat request (HARD) reference configuration, or any combination thereof.

11. The UE of claim 9, wherein the adaptive TTI configuration comprises a first set of symbol partitions for a DL operation and a second set of symbol partitions for a UL operation.

12. A non-transitory computer-readable medium storing code for wireless communication, the code comprising instructions executable by a processor to:

receive a first indication of a first communication configuration for a set of transmission time intervals (TTIs), wherein the first communication configuration comprises a respective TTI configuration for each TTI of the set of TTIs, and wherein each respective TTI configuration comprises an uplink (UL) TTI configuration, a downlink (DL) TTI configuration, or a special TTI configuration;

receive a second indication that indicates an adaptive TTI configuration of a set of adaptive TTI configurations for an adaptive TTI of the set of TTIs, wherein the adaptive TTI configuration comprises at least one of a number of DL symbols, a number of UL symbols, or both based at least in part on the respective TTI configuration corresponding to the adaptive TTI, wherein a structure of the adaptive TTI configuration of the adaptive TTI is dependent on a structure of the respective TTI configuration of the adaptive TTI, and wherein the adaptive TTI configuration of the adaptive TTI is different from the respective TTI configuration of the adaptive TTI; and communicate according to the adaptive TTI configuration during the adaptive TTI and according to the respective TTI configurations during remaining TTIs of the set of TTIs.

13. The method of claim 1, wherein the special TTI configuration corresponds to a set of DL symbols and a set of UL symbols within the set of TTIs.

14. The method of claim 1, wherein the second indication of the adaptive TTI configuration is received via downlink control information (DCI).

15. The UE of claim 9, wherein the adaptive TTI configuration comprises a UL data portion and a hybrid automatic repeat request (HARD) feedback portion.

16. The UE of claim 9, wherein the adaptive TTI configuration comprises a frequency division multiplexing (FDM) configuration or a time division multiplexing (TDM) configuration, or a combination thereof.

17. The UE of claim 9, wherein a first portion of a DL symbol period indicated by the adaptive TTI configuration comprises at least one control channel symbol period and a second portion of the DL symbol period comprises at least one data channel symbol period.

18. The UE of claim 9, wherein a grant comprises the second indication of the adaptive TTI configuration.

19. The UE of claim 9, wherein the special TTI configuration corresponds to a set of downlink symbols and a set of uplink symbols within the set of TTIs.

20. The UE of claim 9, wherein the second indication of the adaptive TTI configuration is received via downlink control information (DCI).

* * * * *